(12) United States Patent
Young et al.

(10) Patent No.: US 7,713,567 B2
(45) Date of Patent: *May 11, 2010

(54) METHOD OF MAKING COFFEE COMPOSITIONS WITH STABLE FLAVOR CHARACTERISTICS

(75) Inventors: Jerry Douglas Young, Cincinnati, OH (US); Douglas Craig Hardesty, Amelia, OH (US)

(73) Assignee: The Folgers Coffee Company, Cincinnati, OH (US)

( * ) Notice: Subject to any disclaimer, the term of this patent is extended or adjusted under 35 U.S.C. 154(b) by 566 days.

This patent is subject to a terminal disclaimer.

(21) Appl. No.: 11/087,757

(22) Filed: Mar. 23, 2005

(65) Prior Publication Data

US 2005/0163907 A1  Jul. 28, 2005

Related U.S. Application Data

(62) Division of application No. 10/074,850, filed on Feb. 13, 2002, now abandoned.

(60) Provisional application No. 60/268,404, filed on Feb. 13, 2001.

(51) Int. Cl.
    A23F 5/00 (2006.01)
(52) U.S. Cl. ............... 426/594; 426/442; 426/330.3
(58) Field of Classification Search ............ 426/594, 426/442, 330.3
    See application file for complete search history.

(56) References Cited

U.S. PATENT DOCUMENTS

| 1,822,227 A | 9/1931 | Lendrich et al. |
| 2,553,467 A | 5/1951 | Neef |
| 2,853,387 A | 9/1958 | Nutting |
| 3,373,041 A | 3/1968 | Bloom et al. |
| 3,652,292 A | 3/1972 | Bach et al. |
| 3,753,726 A | 8/1973 | Clinton et al. |
| 4,540,591 A | 9/1985 | Dan et al. |
| 4,857,351 A | 8/1989 | Neilson et al. |
| 4,985,271 A | 1/1991 | Neilson et al. |
| 5,229,155 A | 7/1993 | Weisemann et al. |
| 5,332,591 A | 7/1994 | Ogden |
| 5,384,143 A * | 1/1995 | Koyama et al. ............ 426/546 |
| 5,401,524 A | 3/1995 | Burkes et al. |
| 5,853,787 A | 12/1998 | Gurol |

(Continued)

FOREIGN PATENT DOCUMENTS

CA    2437770    8/2002

(Continued)

OTHER PUBLICATIONS

Hunter, R.S. —"Photoelectric Color Difference Meter", Journal of the Optical Society of America, Vol. 48, (1953) pp. 985-995.

(Continued)

*Primary Examiner*—Anthony Weier
(74) *Attorney, Agent, or Firm*—Calfee, Halter & Griswold LLP

(57) ABSTRACT

A method for altering a coffee source component profile of an aged coffee source to mimic a target coffee component profile of a non-aged coffee source, wherein the aged coffee source and the non-aged coffee each comprise multiple taste contributing acids.

16 Claims, 4 Drawing Sheets

U.S. PATENT DOCUMENTS

| | | | |
|---|---|---|---|
| 5,993,877 | A | 11/1999 | Ohtake |
| 6,039,996 | A | 3/2000 | Hornack |
| 6,048,567 | A | 4/2000 | Villagran et al. |
| 6,054,162 | A * | 4/2000 | Bradbury et al. ......... 426/330.3 |
| 6,056,989 | A | 5/2000 | Sasagawa et al. |
| 6,102,213 | A * | 8/2000 | Gurol ........................ 210/506 |
| 6,177,119 | B1 | 1/2001 | Zeller et al. |
| 6,207,203 | B1 | 3/2001 | Atkinson et al. |
| 6,207,211 | B1 | 3/2001 | Wasserman et al. |
| 6,399,131 | B2 | 6/2002 | Zeller et al. |
| 6,544,576 | B2 * | 4/2003 | Zeller et al. ................. 426/594 |
| 6,669,979 | B1 | 12/2003 | Zhao et al. |
| 2002/0155210 | A1 | 10/2002 | Hardesty et al. |
| 2002/0187241 | A1 | 12/2002 | Young et al. |
| 2005/0214433 | A1 | 9/2005 | Hardesty et al. |

FOREIGN PATENT DOCUMENTS

| | | |
|---|---|---|
| CH | 263967 | 12/1949 |
| CN | 1047069 | 12/1999 |
| DE | 37 10 768 A1 | 10/1988 |
| DE | 41 03 209 C1 | 12/1992 |
| DE | 4434400 | 3/1996 |
| DE | 19700368 | 9/1998 |
| EP | 0 282 762 | 3/1987 |
| EP | 0 282 345 A2 | 9/1988 |
| EP | 0 861 596 A1 | 9/1998 |
| GB | 879325 | 10/1961 |
| JP | 44-016343 | 7/1969 |
| JP | 59-1375 | 1/1984 |
| JP | 59-91845 | 5/1984 |
| JP | 64-047344 | 2/1989 |
| JP | 3-133368 | 6/1991 |
| JP | 10042824 | 2/1998 |
| JP | 10-215771 | 8/1998 |
| JP | 11-32680 | 2/1999 |
| JP | 11-225673 | 8/1999 |
| JP | 2000-300180 | 10/2000 |
| JP | 2000-342182 | 12/2000 |
| RU | 2099979 | 12/1997 |
| WO | WO 92/03061 | 3/1992 |
| WO | WO 95/17826 A1 | 7/1995 |
| WO | WO 97/23139 A1 | 7/1997 |
| WO | WO 98/27818 A1 | 7/1998 |
| WO | WO 99/62345 A1 | 12/1999 |
| WO | WO 00/04789 A1 | 2/2000 |
| WO | WO 00/27226 A1 | 7/2000 |
| WO | 02/63971 | 8/2002 |
| WO | 02/63972 | 8/2002 |

OTHER PUBLICATIONS

Harris, Daniel C. — "Quantitative Chemical Analysis", 4th Edition, W.H. Freeman and Company, 1995, pp. 217-270.

Scholz, Barbara M.; Maier, Hans Gerhard; "Isomers of Quinic Acid and Quinide in Roasted Coffee"; Z Lebensm Unters Forsch (1990), pp. 132-134.

Clifford, Michael, Ph.D.; "What Factors Determine the Intensity of Coffee's Sensory Attributes?"; Tea & Coffee Trade Journal; vol. 159, Sep. 1987, pp. 34-36.

Clarke, R.; "Carboxylic Acids", Coffee- vol. 1 Chemistry; Elsevier Applied Science Publishers; 1985, p. 271-281.

Office Action issued Oct. 15, 2008, for Canadian Patent Application No. 2,437,770.

Response and Amendment submitted Apr. 15, 2009, in response to Office Action issued Oct. 15, 2009, for Canadian Patent Application No. 2,437,770.

Office Action issued Oct. 16, 2009, for Canadian Patent Application No. 2,437,829.

Response and Amendment submitted Apr. 16, 2009, in response to Office Action issued Oct. 16, 2009, for Canadian Patent Application No. 2,437,829.

Communication from European Application No. 02709630.4 dated Nov. 11, 2004.

Response to Communication from European Application No. 02709630.4 dated May 19, 2005.

Communication from European Application No. 02709630.4 dated Jul. 25, 2005.

Response to Communication from European Application No. 02709630.4 dated Mar. 22, 2006.

Communication from European Application No. 02713599.5 dated Nov. 12, 2004.

Response to Communication from European Application No. 02713599.5 dated Jun. 07, 2005.

Communication from European Application No. 02713599.5 dated Jul. 25, 2005.

Response to Communication from European Application No. 02713599.5 dated Mar. 22, 2006.

Communication from European Application No. 02713599.5 dated Aug. 01, 2006.

Communication from European Application No. 02713599.5 dated Nov. 29, 2006.

Response to Communication from European Application No. 027135993.5 dated Nov. 28, 2006.

Notice of Allowance from U.S. Appl. No. 11/132,819 dated Sep. 25, 2009.

Related U.S. Appl. No. 10/074,851 filed Feb. 13, 2002.

Related U.S. Appl. No. 10/074,822 filed Feb. 13, 2002.

Related U.S. Appl. No. 10/077,325 filed Feb. 15, 2002.

Related U.S. Appl. No. 10/074,850 filed Feb. 13, 2002.

International Search Report from PCT/US02/05223 dated Oct. 9, 2002.

International Preliminary Examination Report from PCT/US02/05223 dated Jan. 8, 2003.

Notice of Abandonment from U.S. Appl. No. 10/074,850 dated Sep. 30, 2005.

U.S. Patent Office communication from U.S. Appl. No. 10/074,850 dated Feb. 23, 2005.

Amendment from U.S. Appl. No. 10/074,850 dated Nov. 26, 2004.

Office action from U.S. Appl. No. 10/074,850 dated Jul. 1, 2004.

Office action from Canadian Application No. 2,437,829 dated Jul. 23, 2007.

Response to Office action from Canadian Application No. 2,437,829 dated Jan. 18, 2008.

Office action from Japanese Application No. 2002-563779 dated Jun. 10, 2008.

Outline of Response to Jun. 10, 2008 Office action in Japanese Application No. 2002-563779 filed Aug. 10, 2008.

Office action from Japanese Application No. 2002-563779 dated May 1, 2009.

Griffin et al., "Determination of the relationsHip between phosphate concentration and perceived acidity in coffee", Dept of Chemistry, Davidson College, http://vvww.coffeeresearch.org/research/phosphate1.pdf, Mar. 14, 2003 using Internet Archive WayBack Machine.

International Search Report form PCT/US02/4471 dated Sep. 23, 2002.

International Preliminary Examination Report from PCT/US02/4471 dated Dec. 13, 2002.

Office action from U.S. Appl. No. 10/077,325 dated Jul. 1, 2004.

Amendment from U.S. Appl. No. 10/077,325 dated Nov. 23, 2004.

Office action from U.S. Appl. No. 10/077,325 dated Feb. 3, 2005.

Interview Summary and Notice of Abandonment from U.S. Appl. No. 10/077,325 dated Aug. 12, 2005.

Office action from U.S. Appl. No. 11/132,819 dated Nov. 1, 2007.

Amendment from U.S. Appl. No. 11/132,819 dated Feb. 1, 2008.

Office action from U.S. Appl. No. 11/132,819 dated Apr. 30, 2008.

Amendment from U.S. Appl. No. 11/132,819 dated Aug. 25, 2008.

Office action from U.S. Appl. No. 11/132,819 dated Oct. 2, 2008.

Amendment from U.S. Appl. No. 11/132,819 dated Apr. 2, 2009.

Notice of Allowance from U.S. Appl. No. 11/132,819 dated Jun. 12, 2009.

Office action from Canadian Application No. 2,437,770 dated Jul. 16, 2007.

Response from Canadian Application No. 2,437,770 dated Jan. 16, 2008.
Office action from Canadian Application No. 2,437,770 dated Oct. 15, 2008.

Response from Canadian Application No. 2,437,770 dated April 15, 2009.

* cited by examiner

METHOD OF MAKING COFFEE COMPOSITIONS WITH STABLE FLAVOR CHARACTERISTICS

CROSS REFERENCE TO RELATED APPLICATIONS

This application is a Divisional of U.S. application Ser. No. 10/074,850, filed Feb. 13, 2002, now abandoned, which claims priority to U.S. Provisional Application No. 60/268,404, filed Feb. 13, 2001.

FIELD OF THE INVENTION

The present invention relates to novel coffee compositions with stable flavor characteristics. In particular, the present invention relates to novel processes for preparing stable, flavored coffee beverages and compositions and the products comprising them.

BACKGROUND OF THE INVENTION

High quality coffee food and beverage products enjoy considerable popularity and make up an increasingly significant proportion of the diets of many people. However, these high quality coffee products are both expensive to purchase and to produce. One such reason is the cost of the raw materials. Due to the nature of coffee production (e.g., growing cycle, season, location, and the like) it is difficult to offset an increased demand for consumer preferred coffees with additional levels of supply. This supply shortage results in higher production costs for high quality coffee food and beverage products that must eventually be borne by the consumer.

One approach to reducing cost has been the use of blends of high cost and low cost coffee varieties. Expensive coffees having consumer preferred taste characteristics are blended with less expensive, less taste preferred coffees varieties. However, this solution is not without shortcomings. Most notably, the inverse relationship that exists between the use of less preferred coffee varieties and the consumer's positive taste perception of the finished coffee product. As the proportion of "cheaper" coffees used increases, the consumer's positive flavor perception of the finished coffee product decreases.

Additionally, coffee products made from blends of high cost and low cost coffees frequently impose additional processing and production complexities, which in turn can also increase production and consumer purchase cost.

Examples of this approach can be found in European Patent Application No. 0282762, to Varsanyl et al.; European Patent Application No. 0861596A1, to Bradbury et al. Additional examples can be found in U.S. Pat. No. 5,993,877 to Ohtake et al.; U.S. Pat. No. 5,853,787 to Tamer et al.; U.S. Pat. No. 5,229,155 to Weisemann et al.; and U.S. Pat. No. 2,853,387 to Nutting.

Another approach has been to try and maximize the yield obtained from a given supply of high cost coffee by decreasing the frequency with which the high value, high cost coffees is discarded. Typically, this is accomplished by extending the time which a brewed or extracted coffee is held prior to either serving or disposing. However, as coffee hold-time increases a coffee's flavor is marked by a dramatic degradation in quality resulting from aging reactions. The longer the coffee is held, and the higher the temperature, the more pronounced the degradation. The flavor degradation is especially pronounced in liquid coffees such as brews and extracts. It is not uncommon for the flavor of coffee to become unstable (e.g., suffer from aging) prior to the point at which the expense of producing the coffee has been recovered.

Considerable effort, therefore, has been expended in an attempt to address the consumer acceptance limitations of using low cost coffees in the production of high quality coffee products, and the extended use of high quality coffees. There remains a need in the art for compositions and methods for flavoring coffee that ensures consistent, stable, high product quality, which are easily adaptable to a variety of less costly coffee materials, and are economical and easy to use. Accordingly, it is an object of the present invention to provide compositions and methods which address these needs and provide further related advantages.

SUMMARY OF THE INVENTION

In one embodiment, the present invention relates to a ready to drink coffee beverage comprising a coffee portion, said coffee portion comprising a principal coffee component and N relevant coffee components, where N is a number in the range of from about 1 to about 20, wherein the principal coffee component corresponds to a principal coffee component of a second coffee and the relevant coffee components correspond to relevant coffee components of the second coffee, and wherein the total concentration of the principal coffee component is in the range of from about 50% below to about 50% above the total concentration of the corresponding principal coffee component in the second coffee, and wherein the value of the total concentration of the principal coffee component divided by the total concentration of each of the relevant coffee components is within the range of from about 50% below to about 50% above the value of the total concentration of the corresponding principal coffee component in the second coffee divided by the total concentration of the corresponding relevant coffee components in the second coffee, and wherein the second coffee is non-aged version of the coffee portion.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE INVENTION

Figure 1:
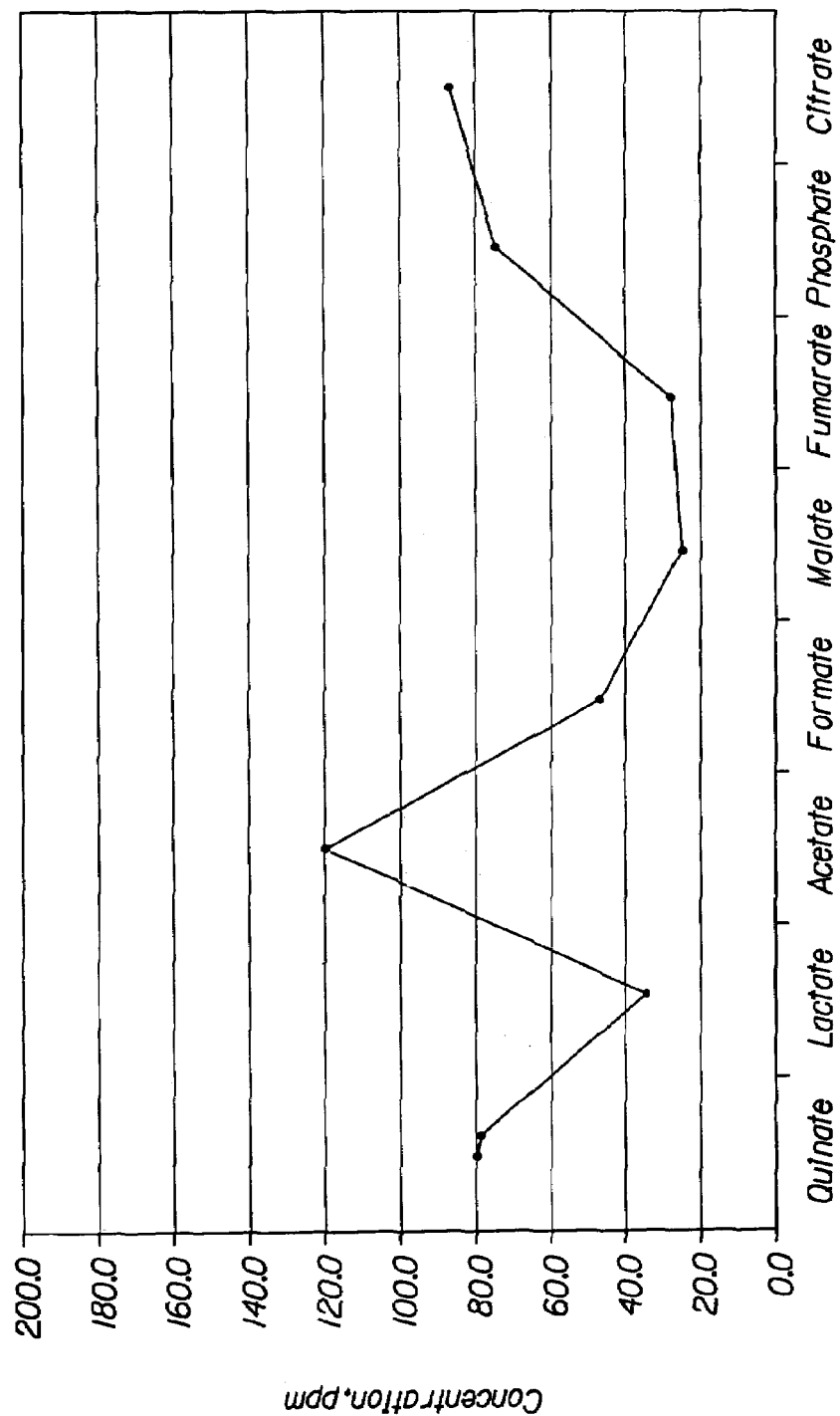
FIG. 1 Is a representation of the Coffee Source Component Profile of a Coffee Source.

The present invention relates to novel coffee compositions with stable flavor characteristics. In particular, the present invention relates to novel processes for preparing stable, flavored coffee compositions and the products comprising them.

A. Definitions

As used herein, the term "coffee source" is defined as a beverage source derived from a plant of the Family *Rubiaceae*, Genus *Coffea*, from a given region of origin. One skilled in the art will appreciate that by region of origin it is meant a coffee growing region wherein the coffee growing process utilizes identical coffee seedlings. Additionally, a region of origin experiences similar soil conditions, fertilization conditions, growing environment (e.g., rainfall amount, temperature, altitude, sunlight), and pre-roasting process, handling, and storage conditions.

There are many coffee species, however, it is generally recognized by those skilled in the art that there are two primary commercial coffee species, *Coffea arabica* and *Coffea canephora* var. *robusta*. Coffees from the Species *arabica* are frequently described as "Brazils," which come from Brazil, or "Other Milds" which are grown in other premium coffee producing countries. Premium *arabica* countries are generally recognized as including Colombia, Guatemala, Sumatra, Indonesia, Costa Rica, Mexico, United States (Hawaii), El Salvador, Peru, Kenya, Ethiopia and Jamaica. Coffees from the Species *canephora* var. *robusta* are typically used as a low cost extender for *arabica* coffees. These *robusta* coffees are typically grown in the lower regions of West and Central Africa, India, South East Asia, Indonesia, and Brazil.

The coffee source can be in a variety of forms including, but not limited to, cherries, beans, leaves, and bark. Additionally, the coffee source can take the form of soluble coffee, roast and ground, roasted whole bean, green coffee, and dried or liquid extracts of coffee via aqueous, super-critical fluid, and organic solvent extraction processes. The coffee source can also be caffeinated, decaffeinated, or a blend of both.

As used herein, the term "coffee source component" is defined as one of the taste contributing acids contained within the coffee source. One skilled in the art will appreciate that by the term acid it is meant the combination of the acid's associated and dissociated forms. The coffee source component is generated or formed as a result of coffee source growing, harvesting, processing, roasting, fermentation, preparation, handling and/or storage processes.

As used herein, the term "taste contributing" is defined as an acid contained within the coffee source whose concentration is perceptible by taste at a concentration in water that is identical to the concentration of the acid in the target coffee and is correlated to roasting conditions, or whose concentration varies with coffee region of origin, or whose concentration varies with the coffee species. Perceptible by taste is defined as modifying the sensory perception of one or more of the following beverage flavor characteristics: sweet, salty, bitter, winey, acidy, mellow, bland, sharp, harsh, pungent, and the like.

As used herein, the term "coffee source component profile" is defined as the concentration of coffee source components present within the coffee source. The coffee source component profile can be represented by a graph, a table, or some other suitable visual representation showing the existence and concentrations of coffee source components.

As used herein, the term "supplemental coffee source component" is defined as a taste contributing acid. The taste contributing acid of the supplemental coffee source component corresponds to a target coffee component, though it may exist in the same or a different form of the acid. The supplemental coffee source component can exist in one or more forms selected from the following group: acidic form of the taste contributing acid, anionic form of the taste contributing acid, and metallic and ammonium salts of the taste contributing acid.

As used herein, the term "coffee source component modifier" is defined as a compound, or set of compounds, that adjusts the perceptible concentration of one or more coffee source components. Acceptable coffee source component modifiers include one or more of the following: sodium, magnesium, potassium, hydrogen, calcium, and ammonium cations, in combination with hydroxide, carbonate, bicarbonate, gluconate, and sulfates. The addition of a coffee source component modifier will modify the taste perceptible concentration of one or more coffee source components.

As used herein the term "resulting coffee component" is defined as the combination of a coffee source component and a corresponding supplemental coffee source component.

As used herein the term "resulting coffee component profile" is defined as the concentration of one or more resulting coffee components present within a coffee portion. The resulting coffee component profile can be represented by a graph, a table, or some other suitable visual representation showing the existence and concentrations of resulting coffee components.

As used herein, the term "target coffee" is defined as a desired coffee beverage or coffee composition. The target coffee comprises a coffee element that is generally derived from a bean or a blend of beans from a plant of the Family *Rubiaceae*, Genus *Coffea*, from a given region of origin. However, the coffee element of the target coffee can also be derived from a variety of coffee materials including, but not limited to, cherries, beans, leaves, and bark. Additionally, the coffee element of the target coffee can take the form of soluble coffee, roast and ground, roasted whole bean, green coffee, and liquid or dried extracts of coffee via aqueous, super-critical fluid, and organic solvent extraction processes. The coffee element can also be caffeinated, decaffeinated, or a blend of both.

As used herein, the term "target coffee component" is defined as one of the taste contributing acids contained within the coffee element of the target coffee. One skilled in the art will appreciate that by the term acid it is meant the combination of an acid's associated and disassociated forms. The target coffee component is generated or formed as a result of target coffee growing, harvesting, processing, roasting, fermentation, preparation, handling and/or storage processes.

As used herein, the term "target coffee component profile" is defined as the concentration of target coffee components present within the coffee element of the target coffee. The target coffee component profile can be represented by a graph, a table, or some other suitable visual representation showing the existence and concentrations of target coffee components.

B. Coffee Source

It has been determined according to the present invention that coffee beverages and compositions that exhibit consumer preferred flavor characteristics may be produced from a variety of coffee sources. The preferred coffee source for a particular use may vary according to considerations of availability, expense, and flavor associated with the coffee source. Additionally, the degree and nature of impurities and other components in the coffee source may be considered. A coffee beverage composition may also be produced from a blend of one or more suitable coffee sources.

The coffee beverages and compositions of the present invention comprise a coffee portion, and may optionally contain additional components, such as foaming agents, mouthfeel enhancing agents, flavorants, creamy components, inert fillers and carriers, sweetening agents, and the like. The coffee portion is comprised of a coffee source, and any supplemental coffee source component and/or coffee source component modifier required.

Coffee sources exist in a variety of forms including, but not limited to, cherries, leaves, bark, soluble coffee, instant coffee, roast and ground, roasted whole bean, green coffee beans, extracts including aqueous, super-critical fluid, and organic solvents, and mixtures thereof. Furthermore, the coffee source can be caffeinated, decaffeinated, or a blend of both. It is recognized that coffee sources suitable for use in the present invention may contain various impurities and/or by-products.

Coffee sources of the present invention are defined by coffee variety (i.e., coffee species and region of origin). By region of origin it is meant a coffee growing region wherein the coffee growing process utilizes genetically similar coffee seedlings. Additionally, a region of origin experiences similar soil conditions, fertilization conditions, growing environment (e.g., rainfall amount, temperature, altitude, sunlight), and pre-roasting process, handling, and storage conditions. The species, region of origin, and coffee growing, harvesting, processing, roasting, fermentation, preparation, grafting, genetic engineering, handling and/or storage process conditions determine the presence and concentration of a given acid in a coffee source.

It has been found that the coffee sources of the present invention contain one or more of the following acids: Formic, Acetic, Propanoic, Butanoic, Pentanoic, Hexanoic, Heptanoic, Octanoic, Nonanoic, Decanoic, Palmitic, Crotonic, Isocrotonic, Hydroxyacetic, Isobutyric, Lactic, 3-hydroxypropanoic, Glyceric, 2,3-dihydroxypropanoic, 2-(4-methoxyphenoxy) propanoic, 2-hydroxybutyric, 2,4-dihydroxybutyric, 2-methylbutanoic, Isovaleric, Methacrylic, Tiglic, Angelic, 3-methyl-2-butenoic, Pyruvic, 2-Oxobutyric, 3-oxobutanoic, Levulinic, Oxalic, Malonic, Succinic, Glutaric, Fumaric, Maleic, Methylsuccinic, Malic, Tartaric, 2-hydroxyglutaric, Ketoglutaric, Citraconic, Mesaconic, Itaconic, Citric, Aspartic, Glutamic, Pyroglutamic, Nicotinic, 2-Furoic, Benzoic, 3-hydroxybenzoic, 4-hydroxybenzoic, 2,5-dihydroxybenzoic, 3,4-dihydroxybenzoic, 3,4,5-Trihydroxybenzoic, 1,2,4-trihydroxybenzoic, Vanillic, Phytic, Phosphoric, Quinic, Caffeic, Ferulic, 3-(4-Hydroxy-3-methoxyphenyl)-2-propenoic, p-coumaric, o-coumaric, 4-methoxycinnamic, 3,4-dimethoxycinnamic, 3,4,5-trimethoxycinnamic, 3-caffeoylquinic, 4-caffeoylquinic, 5-caffeoylquinic, 3-feruloylquinic, 4-feruloylquinic, 5-feruloylquinic, 3,4-dicaffeoylqunic, 3,5-dicaffeoylquinic, 4,5-dicaffeoylqunic, p-coumaroylquinic, caffeoylferuoylqunic. The exact concentration of a specific acid within a given coffee source depends on the coffee species selected, the growing and harvesting conditions, and the coffee source preparation processes described above.

Coffee sources have been found to contain varying levels of acids depending on their form. For example, green coffee has been found to contain approximately 11% total acid by weight, roasted coffee has been found to contain approximately 6% total acid content by weight, and instant coffee has been found to contain approximately 16% total acid content by weight.

C. Coffee Source Component

A coffee source component is defined as a taste contributing acid present within a given coffee source. As used herein the term "taste contributing" is defined as an acid contained within the coffee source that is perceptible by taste at a concentration in water that is identical to the concentration of the acid in the target coffee. Perceptible by taste is defined herein as modifying the sensory perception of one or more of the following flavor characteristics: sweet, salty, bitter, winey, acidy, mellow, bland, sharp, harsh, pungent, and the like. In addition, a taste contributing acid is an acid whose concentration exhibits at least one of the following phenomenon: a roast effect; a coffee species effect; and a coffee region of origin effect.

As used herein the term roast effect is defined as the existence of a relationship between the concentration of the acid in a roasted coffee source and the roasting conditions selected. One skilled in the art will appreciate that roasting conditions are generally recognized as time, heat input and moisture. One skilled in the art will also appreciate that the roasting conditions selected for a given coffee source can be characterized by roast time, roasting equipment, and a Hunter L* color. As used herein, color differences are defined in terms of readings measured on a Hunter calorimeter and specifically the values L*, a* and b* derived from the Hunter CIE scale. See pages 985-95 of R. S. Hunter, "Photoelectric Color Difference Meter," *J. of the Optical Soc. of Amer.*, Volume 48, (1958), herein incorporated by reference.

As used herein, the term coffee species effect is defined as an acid having a concentration in a coffee source of one coffee species, subjected to a given set of growing, harvesting, and processing conditions, that is different from the concentration in a different coffee species, subjected to identical growing, harvesting, and processing conditions. As used herein, the term coffee region of origin effect is defined as an acid having a concentration that is dependent on the coffee growing, harvesting, processing, fermentation, preparation, handling and/or storage processes.

The presence of a given coffee source component, and its corresponding concentration within a coffee source, is a function of many factors. The factors vary depending on the specific coffee source selected. Most notable among these, however, is the selection of a specific coffee species. Additionally, growing conditions such as rainfall amounts, temperature, fertilization, harvesting, handling, and storage of the coffee species contribute greatly to the presence and concentration of a given coffee source component. Moreover, subsequent processing and preparation of the coffee species may significantly impact coffee source component concentrations.

The coffee source component can exist within a coffee source in a variety of forms. Frequently the coffee source component is present in the acidic form of the taste contributing acid. As an acid, the coffee source component exists in both the associated and disassociated forms of the acid. However, it has been found that in the present invention suitable coffee source components may also exist as salts of the taste contributing acid.

D. Coffee Source Component Profile

A Coffee source component profile is defined as the concentration of coffee source components present within a given coffee source. The coffee source component profile represents the coffee source component concentration at a pH value of 14, in the completely dissociated form of the acid. The coffee source component profile can take the form of a graph, a table, or some other suitable visual representation showing the existence and concentrations of coffee source components.

Table 1 is a tabular representation of the coffee source component profile of a roast and ground coffee source (Vietnam robusta, roasted for 854 seconds on a Thermalo batch roaster, to a Hunter L-color of 17.68). FIG. 1 is a graphical representation of the same coffee source component profile.

TABLE 1

Vietnam robusta, roasted for 854 seconds on a Thermalo batch roaster to a Hunter L-color of 17.68

| Coffee Source Component (Anionic Form) | Concentration (ppm) |
| --- | --- |
| Quinate | 79 |
| Lactate | 30 |

TABLE 1-continued

Vietnam robusta, roasted for 854 seconds on a Thermalo batch roaster to a Hunter L-color of 17.68

| Coffee Source Component (Anionic Form) | Concentration (ppm) |
| --- | --- |
| Acetate | 119 |
| Formate | 45 |
| Malate | 24 |
| Fumarate | 27 |
| Phosphate | 77 |
| Citrate | 85 |

E. Target Coffee, Target Coffee Component, and Target Coffee Component Profile

As used herein the term "target coffee" is defined as a target coffee beverage or composition. The target coffee comprises a coffee element. The target coffees of the present invention may optionally contain additional elements, such as foaming agents, mouthfeel enhancing agents, flavorants, creamy components, inert fillers and carriers, sweetening agents, and the like.

The coffee element of the target coffee is derived from a plant of the Family *Rubiaceae*, Genus *Coffea*, from a given region of origin. The coffee element of the target coffee can be in a variety of forms including, but not limited to, cherries, beans, leaves, and bark, and mixtures thereof. Additionally, the coffee element can take the form of soluble coffee, roast and ground, roasted whole bean, green coffee, and extracts of coffee via aqueous, super-critical fluid, and organic solvent extraction processes. The coffee element of the target coffee may also exist as a mixture of two or more of the aforementioned forms. The coffee element may be caffeinated, decaffeinated, or a blend of both.

It has been found that the coffee element of the target coffee contains one or more of the following acids: Formic, Acetic, Propanoic, Butanoic, Pentanoic, Hexanoic, Heptanoic, Octanoic, Nonanoic, Decanoic, Palmitic, Crotonic, Isocrotonic, Hydroxyacetic, Isobutyric, Lactic, 3-hydroxypropanoic, Glyceric, 2,3-dihydroxypropanoic, 2-(4-methoxyphenoxy) propanoic, 2-hydroxybutyric, 2,4-dihydroxybutyric, 2-methylbutanoic, Isovaleric, Methacrylic, Tiglic, Angelic, 3-methyl-2-butenoic, Pyruvic, 2-Oxobutyric, 3-oxobutanoic, Levulinic, Oxalic, Malonic, Succinic, Glutaric, Fumaric, Maleic, Methylsuccinic, Malic, Tartaric, 2-hydroxyglutaric, Ketoglutaric, Citraconic, Mesaconic, Itaconic, Citric, Aspartic, Glutamic, Pyroglutamic, Nicotinic, 2-Furoic, Benzoic, 3-hydroxybenzoic, 4-hydroxybenzoic, 2,5-dihydroxybenzoic, 3,4-dihydroxybenzoic, 3,4,5-Trihydroxybenzoic, 1,2,4-trihydroxybenzoic, Vanillic, Phytic, Phosphoric, Quinic, Caffeic, Ferulic, 3-(4-Hydroxy-3-methoxyphenyl)-2-propenoic, p-coumaric, o-coumaric, 4-methoxycinnamic, 3,4-dimethoxycinnamic, 3,4,5-trimethoxycinnamic, 3-caffeoylquinic, 4-caffeoylquinic, 5-caffeoylquinic, 3-feruloylquinic, 4-feruloylquinic, 5-feruloylquinic, 3,4-dicaffeoylqunic, 3,5-dicaffeoylqunic, 4,5-dicaffeoylqunic, p-coumaroylquinic, caffeoylferuoylqunic. The exact concentration of an given acid within a the coffee element of the target coffee depends on the coffee species selected, the growing and harvesting conditions, and coffee element preparation processes described above.

The target coffee component profile is defined as the concentration of target coffee components present within the coffee element of the target coffee. The target coffee component profile can be represented by a graph, a table, or some other suitable visual representation showing the existence and concentrations of target coffee components.

Figure 2:
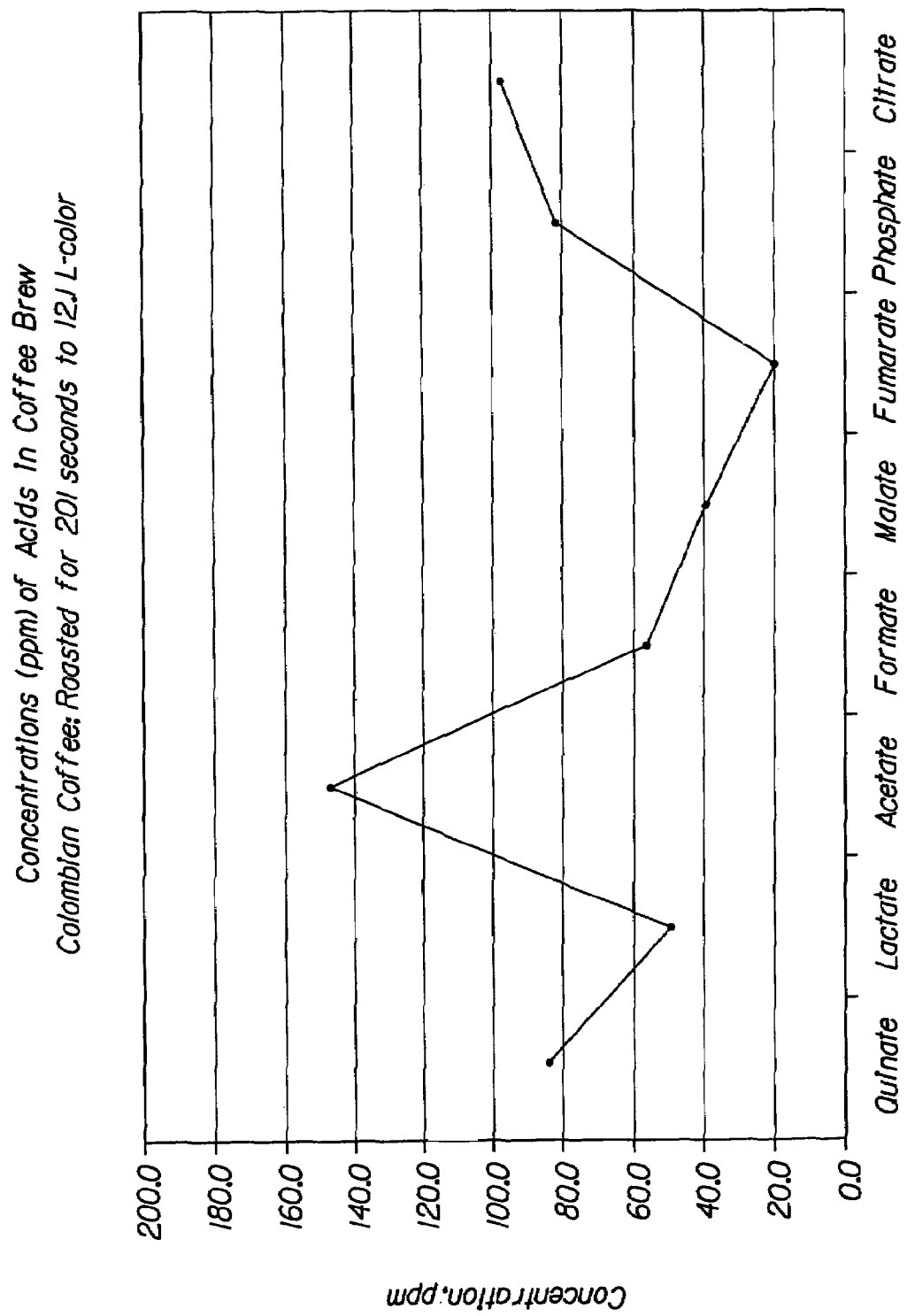
FIG. 2 Is a representation of a Target Coffee Component.
Figure 3:
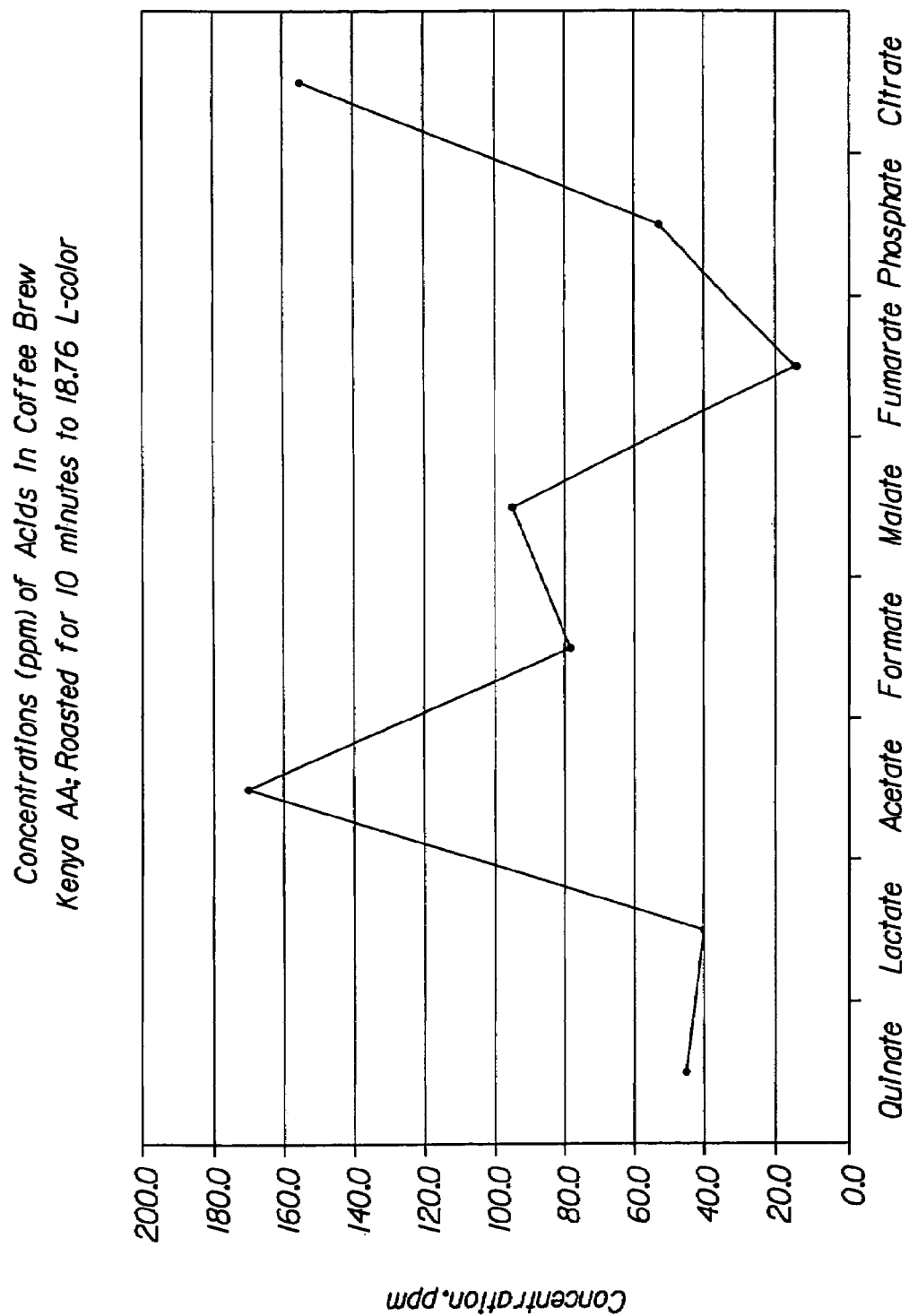
FIG. 3 Is a representation of a Target Coffee Component.

In one embodiment of the present invention the coffee element is a Colombian arabica, roasted for 201 seconds on a Thermalo batch roaster, to a Hunter L-color of 12.1. FIG. 2 is a graphical representation of the Columbian Arabica's target component profile. In another embodiment of the present invention the coffee element is a Kenya AA (arabica), roasted on a Jabez Burns laboratory roaster for 10 minutes, to a Hunter L-color of 18.76. The target component profile is shown in FIG. 3.

In another embodiment of the present invention a coffee source is provided that is a brewed roast and ground coffee that has been held at 185° F. for six hours. In this embodiment the coffee element of the target coffee is the same coffee immediately following brewing, prior to the onset of any significant aging processes.

F. Coffee Source Component Modifier

A coffee source component modifier is defined as a compound, or combination of compounds, that adjusts the perceptible concentration of one or more coffee source components. In solution, an acid can exist entirely in an associated form, entirely in a dissociated form, or as a combination of the two. The proportion of a given acid that exists in its associated and dissociated states is, in part, a function of the equilibrium constant for the given acid (i.e., the $pK_a$). Acceptable coffee source component modifiers include: sodium, magnesium, potassium, hydrogen, calcium, and ammonium cations, in combination with hydroxide, carbonate, bicarbonate, gluconate, and sulfates.

The coffee source component modifier compounds can exist in a variety of forms. The coffee source component modifier may exist in a solution of water, or some other suitable aqueous medium. Moreover, the coffee source component modifier can exist in non-aqueous solutions (e.g., oil and glycerin). Alternatively, coffee source component modifier may exist as one or more dry ingredients.

The coffee source component modifier can be combined with the coffee source in a variety of ways, depending on the nature and form of the coffee source and the coffee source component modifier. If the coffee source selected were a roast and ground coffee, the coffee source component modifier could exist in an aqueous solution that is sprayed onto, or mixed with, the roast and ground coffee. Alternatively, the coffee source component modifier could exist in a dry state, and be mixed with the roast and ground coffee source in a coffee composition. When the coffee composition is transformed into a coffee beverage, the coffee source component modifier would then act to adjust the perceptible concentration of the coffee source component in the method described. A coffee source component modifier existing in solution could also be applied (e.g., by spraying or mixing) to a roasted whole bean, green coffee bean, liquid coffee extract, soluble coffee, or other form of a coffee source (e.g., cherries, leaves, and the like). The same is true for a coffee source component modifier existing in a dry state. The coffee source component modifier can exist in any suitable form in an intermediate state of the final, consumable coffee beverage. The form of the coffee source component modifier is only limited by the need to exist in a state capable of adjusting the perceived concentration of the coffee source component, in the final, consumable form of the coffee beverage.

Coffee source component modifiers that are a combination of two or more suitable compounds can be combined with the coffee source together or separately. Additionally, multi-compound component modifiers can exist in different states (e.g., in solution and a dry state) so long as they are capable of adjusting the perceived concentration of the coffee source component, in the final, consumable form of the coffee beverage.

The coffee source component modifiers of the present invention also need not be applied directly to the coffee source to be effective. The coffee beverages and coffee compositions of the present invention may include additional ingredients, such as foaming agents, mouthfeel enhancing agents, flavorants, creamy components, inert fillers and carriers, sweetening agents, and the like. The coffee source component modifiers may be combined with any of these additional ingredients, in a suitable form, such that they are capable of adjusting the perceived concentration of the coffee source component, in the final, consumable form of the coffee beverage.

G. Supplemental Coffee Source Component

A supplemental coffee source component is defined as a taste contributing acid. Where the target coffee is a non-aged or less-aged version of the coffee source, the supplemental coffee source component will be a taste contributing acid that corresponds to the taste contributing acid of the coffee source component, though it may exist in the same or a different form of the acid. Where the target coffee is not a non-aged or less-aged version of the coffee source, the supplemental coffee source component may be any taste contributing acid preferred in the target component profile.

The supplemental coffee source component can exist in either the acidic form of the taste contributing acid (e.g., Citric Acid; Malic Acid; Formic Acid; Fumaric Acid; Phosphoric Acid; 2-Furoic Acid; Lactic Acid; Acetic Acid.), or as a salt of the taste contributing acid (e.g., Mono-, Di-, or Tri-Sodium Citrate; Mono-, Di-, or Tri-Potassium Citrate; Mono-, or Di-Sodium Malate; Mono- or Di-Potassium Malate; Sodium Formate; Potassium Formate; Mono- or Di-Sodium Fumarate; Mono- or Di-Potassium Fumarate; Mono-, Di-, or Tri-Sodium Phosphate; Mono-, Di-, or Tri-Potassium Phosphate; Sodium Furoate; Potassium Furoate; Sodium Lactate; Potassium Lactate).

Though the supplemental source component may be any of the taste contributing acids, preferred taste contributing acids are the acids of the following anions: Quinate, Lactate, Acetate, Formate, 2-Furoate, 3-Methyl Malate, Citramalate, Hydroxyglutarate, Glutarate, Malate, Citraconate, Maleate, Mesaconate, Oxalate, Fumarate, Phosphate and Citrate.

The supplemental coffee source components of the present invention may exist in a variety of forms. The supplemental coffee source component may exist in a solution of water, or some other suitable aqueous medium. Moreover, the supplemental coffee source component can exist in non-aqueous solutions (e.g., oil and glycerin). Alternatively, supplemental coffee source component may exist as one or more dry ingredients.

The supplemental coffee source component can be combined with the coffee source in a variety of ways, depending on the nature and form of the coffee source and the supplemental coffee source component. If the coffee source selected were a roast and ground coffee, the supplemental coffee source component could exist in an aqueous solution that is sprayed onto, or mixed with, the roast and ground coffee. Alternatively, the supplemental coffee source component could exist in a dry state, and be mixed with the roast and ground coffee source in a coffee composition. When the coffee composition is transformed into a coffee beverage, the supplemental coffee source component would then act to supplement the total concentration of the corresponding coffee source component in the method described herein.

A supplemental coffee source component existing in solution could also be applied (e.g., by spraying or mixing) to a roasted whole bean, green coffee bean, liquid coffee extract, soluble coffee, or other form of a coffee source (e.g., cherries, leaves, and the like). The same is true for a supplemental coffee source component existing as a dry ingredient. The supplemental coffee source component can exist in any suitable form, in an intermediate state of the final, consumable coffee beverage. The exact form of the supplemental coffee source component is only limited by the need to exist in a state capable of supplementing the total concentration of the corresponding coffee source component, in the final, consumable form of the coffee beverage.

Supplemental coffee source components that are a combination of two or more suitable compounds can be combined with the coffee source together or separately. Additionally, multi-compound supplemental coffee source components can exist in different states (e.g., in solution and a dry state) so long as they are capable of supplementing the total concentration of the corresponding coffee source component, in the final, consumable form of the coffee beverage.

The supplemental coffee source components of the present invention need not be combined with the coffee source directly to be effective. The coffee beverages and coffee compositions of the present invention may include additional ingredients, such as foaming agents, mouthfeel enhancing agents, flavorants, creamy components, inert fillers and carriers, sweetening agents, and the like. The supplemental coffee source components may be combined with any of these additional ingredients, in a suitable form, such that they are capable of supplementing the total concentration of the corresponding coffee source component, in the final, consumable form of the coffee beverage.

H. Perceptibility of Acids

The Applicants have observed that the individual acids found in coffee each have an associated flavor note. It has also been observed by Applicants that specific combinations of these acids exhibit characteristic flavors based on the specific combination of acids and their associated flavor notes. Though the ability to perceive the associated flavor note for a given acid in solution by the sensory perception of taste is a function of its concentration, it is not necessarily directly correlated to the acid's total concentration. Not intended to be limited by theory, Applicants believe that the sensory perception of taste is only capable of perceiving an acid in its associated form. Therefore, the portion of the total acid concentration in a dissociated state does not directly contribute to the taste perception of an acid's associated flavor note, nor the perception of characteristic flavors based on the combination of associated flavor notes.

It is understood by the ordinarily skilled artisan that acids exist in both an associated and dissociated state when present in aqueous solutions. The molecular equilibrium is expressed simply as:

$$HA \longleftrightarrow H^+ + A^-$$
Associated Form    Dissociated Forms

The anions may also be found in solutions containing salts of the acid. For a more detailed discussion of the mathematical relationships for this equilibrium see *Quantitative Chemical Analysis*, 4$^{th}$ Edition, by Daniel C. Harris, W.H. Freeman and Company, 1995, pp. 217-270, herein incorporated by reference. The dissociation constant $K_a$ for a given acid expresses the relationship of the three components of the equilibrium in terms of their molar concentrations:

$$K_a = ([H^+][anions])/[HA]$$

The hydrogen ion concentration is expresses by the symbol pH. The Henderson-Hasselbach equation relates the pH of a solution to the acid's $K_a$ value:

$$pH = \log([anions]/[HA]) - \log K_a$$

The negative logarithm of the dissociation constant is known as the $pK_a$ value in a similar manner to the pH value, which is the negative logarithm of the hydrogen ion:

$$pH - pK_a = \log([anions]/[HA])$$

Changes in the pH of a solution result in different concentrations of a given acid's associated and dissociated forms, depending on that given acid's $pK_a$ value. Therefore, as the pH value of a solution changes so does the ability to perceive the taste an acid's characteristic flavor note, or the characteristic flavor of a combination of specific flavor notes.

I. Coffee Aging

Once a coffee is in liquid form, either by brewing, extracting, or other similar processes, it begins to undergo aging process. As used herein, the term "aging" is defined as the processes whereby the flavor profile of a coffee changes in response to an increase in acidity. The aging process typically imparts a bitter and/or sour taste to coffee. The art suggests that the increase in acidity resulting from the aging process is caused by a variety of factors, including hydrolysis of celluloses contained within the coffee; oxidation of aldehydes to acids; hydrolysis of chlorogenic acids to caffeic and quinic acids; and conversion of quinic acid lactones to quinic acid.

Not intending to be limited by theory, Applicants believe that the evolution of additional quantities of acidic species existing in coffee prior to aging, and/or the evolution of additional acidic species not present prior to aging, increases the total hydronium ion concentration ($[H^+]$) within the coffee. As the total hydronium ion concentration in solution increases the equilibrium between any given acid's perceptible and imperceptible concentrations shifts in favor of the perceptible concentration. The extent of the shift is a function of the $pK_a$ of the given acid and the overall change in the pH value of the coffee.

More specifically, it is believed by Applicants that as additional quantities of the acidic species existing in coffee prior to aging are generated, and/or additional acidic species not present prior to aging are generated, the associated flavor notes of these acids come to dominate the overall flavor profile of the coffee. The exact nature and extent of the change in a flavor profile resulting from the aging process depends on several factors. These factors include, but are not limited to, duration of aging, temperature of aging, initial pH, and the identity and quantity of the additional acidic species generated. Moreover, the associated flavor notes for the generated acids play a role, as do their perceptibility by the sensory perception of taste and the interrelatedness of the total hydronium ion concentration in solution to the perceptible concentration of all acids present in the coffee.

The Applicants have further discovered that it is possible to overcome the dispreferred flavor effects of the aging process employing processes whereby the flavor profile of an aged coffee (i.e., a coffee source) is adjusted to approximate or mimic the flavor profile of a corresponding, non-aged coffee (i.e., a target coffee). It has also been discovered that the flavor profile of an aged coffee may be adjusted so as to approximate or mimic the flavor profile of a non-corresponding coffee as well.

Applicants have found that by using a flavor profile modifier the equilibrium between the perceptible and imperceptible concentrations of the acids in the aged coffee can be forced to shift back in favor of the non-perceptible concentration. The flavor profile of the corresponding, non-aged coffee (or if preferred a non-corresponding coffee) can then be mimicked by the addition of sufficient amounts of the appropriate, relevant acids in a target profile.

J. Profile Mimicking and Adjustment

Each acid in coffee has an associated flavor note. Specific combinations of coffee acids will exhibit a characteristic flavor profile based on the combination of associated flavor notes and the perceptible concentration of each of the acids in that combination. Therefore, flavor profiles can be identified for specific coffees of interest wherein the flavor profile for that coffee is a function of the concentration of at a least a portion of the acids in that coffee. Mathematically, the characteristic flavor profile for a specific combination of acids is expressed as the relative ratio of the concentrations of those acids to each other within that combination.

$[A_1]: [A_2]: \ldots : [A_n]$, where $[A_{(1-n)}]$ is the total concentration of the first acid to the $n^{th}$ acid, respectively.

At a given pH, and depending on the pKa of the specific acid, a portion of the concentration of a specific acid will be in a form perceptible by taste (i.e., the associated form of the acid). And therefore, it has been found that what imparts the perceived characteristic flavor of a given profile is the combination of perceptible concentrations of the acids within that combination and their relative ratios to each other.

$[HA_1]: [HA_2]: \ldots : [HA_n]$, where $[HA_{(1-n)}]$ is the perceptible concentration of the first acid to the $n^{th}$ acid, respectively.

Applicants have discovered that the flavor profile of a given coffee (e.g., a coffee source) may be readily adjusted so as mimic the characteristic flavor profile of a different coffee (e.g., a target coffee). As used herein, the term "mimic" is defined as approximating, imitating, or resembling in such a way as to deliver a substantially similar characteristic flavor.

As used herein, the term "corresponding acid" is defined as the acid of the same species. However, it will be appreciated by the ordinarily skilled artisan upon reading the disclosure herein that the corresponding acid does not necessarily have to exist in the same form as the acid of interest. The corresponding acid can exist in the associated form of the acid, the disassociated form of the acid, as a salt of the acid, or as combinations thereof. By way of example, if the acid of interest in a first coffee were malic acid then the corresponding acid in the second coffee would also be malic acid, though it may exist in a different form of the acid as described.

It will also be appreciated by those skilled in the art upon reviewing the disclosure herein, that although the majority of the acids commonly found in coffee have an associated flavor note, not all of these acids will necessarily make a significant and/or preferred contribution to the characteristic flavor profile of a given coffee. Applicants have found that of the acids typically present in coffee only a select set of those can be considered relevant acids.

As used herein, the term "relevant acid" is defined as an acid that would be perceptible by taste at a concentration in water that is equal to the concentration of the acid in the target coffee and, has a concentration that varies according to the coffee roasting conditions selected, or the coffee region of origin, or the coffee species. Similarly stated, the term "relevant acid" is defined herein as one of the taste contributing acids found within coffee that would be perceptible by taste at a concentration in water that is equal to the concentration of the acid in the target coffee and exhibits one or more of the following phenomenon: a coffee roasting effect, a coffee species effect, or a coffee region of origin effect.

It will further be appreciated by the ordinarily skilled artisan in view of the disclosure herein, that not all of the coffee acids that satisfy the heretofore mentioned conditions (i.e., perceptibility in water, roast effect, species effect, and region of origin effect) would necessarily be required to sufficiently mimic a given flavor profile. Factors including, but not limited to, cost, availability, ease of use, manufacturing complexity, classification as a food grade acid by an appropriate regulatory agency such as the U.S. Food and Drug Administration, and commercially significant consumer preference differences between subtly different profiles need to be considered when selecting the exact number and species of relevant acids to be used in the mimicking of a given flavor profile. Therefore, it may be suitable to use only a subset of the relevant acids (i.e., the relevant coffee components) identified within a given coffee to sufficiently mimic the characteristic flavor profile of that coffee.

As used herein, the term "principal acid" is defined as the relevant acid that experiences the largest change in its ratio between the total concentration of that acid in a first coffee (e.g., a coffee source) and the total concentration of the corresponding acid in a second coffee (e.g., a target coffee). By way of example, take a first coffee that contains three relevant acids, acid A, acid B, and acid C. The total concentrations of acids A, B, and C are 100 ppm, 150 ppm, and 200 ppm, respectively. Then take a second coffee which also contains corresponding acids A, B, and C. The total concentrations of the corresponding acids in the second coffee are 200 ppm, 450 ppm, and 300 ppm, respectively. The ratios of each acid in the second coffee to the corresponding acid in the first coffee (i.e., the total concentration of an acid in the second coffee divided by the total concentration of the corresponding acid in the first coffee) are 2 (200 ppm/100 ppm), 3 (450 ppm/150 ppm), and 1.5 (300 ppm/200 ppm), respectively. Therefore, of the relevant acids, acid B is the principal acid because it experiences the largest change in the ratio of its total concentration.

The Applicants have found that the ability to accurately measure changes in the concentration of a given acid within a coffee, analytically, is greater than the ability to measure a comparable change in concentration by the sensory perception of taste. The Applicants have also found that how closely the flavor profile of a first coffee needs to mimic the flavor profile of a second coffee (e.g. the total concentrations of relevant acids in a first coffee have substantially the same relative ratios to each to other as the corresponding relevant acids in the second coffee) to provide a suitable, consumer acceptable approximation of that flavor profile is a function of the ability to accurately perceive the difference between the two profiles, more than the ability to analytically measure the difference.

In one embodiment of the present invention Applicants have determined that for a characteristic flavor profile of a first set of relevant acids, such as would be found in an adjusted coffee (i.e., a coffee source that has been supplemented to mimic a target coffee), to be substantially similar to a characteristic flavor profile of a second set of relevant acids, such as would be found in a second or target coffee, so as to mimic the characteristic flavor profile of that second or target coffee the total concentration of the principal acid of the adjusted coffee must be within in the range of about 50% below to about 50% above the total concentration of the corresponding acid in the target coffee. The total concentration for the principal acid in the adjusted coffee is within the range of from about 40% below to about 40% above the total concentration of the corresponding acid in the target coffee is preferred, a total concentration in the range of about 30% below to about 30% above is more preferred, a total concentration in range of from about 20% below to about 20% above is yet more preferred, a total concentration in range of from about 10% below to about 10% above is yet more preferred, and a total concentration in range of from about 5% below to about 5% above is most preferred.

Moreover, the value of the total concentration of the principal acid of the adjusted coffee divided by the total concentration of each of the relevant acids of the adjusted coffee is within the range of from about 50% below to about 50% above the value of the total concentration of the corresponding principal acid in the target coffee divided by the total concentration of each of the corresponding relevant acids in the target coffee. In other words, for a given adjusted coffee that has N relevant acids, the value of the total concentration of the principal acid (i.e. the principal coffee component) of the adjusted coffee divided by the total concentration of each of the N relevant acids (i.e., the relevant coffee component) of the adjusted coffee is within the range of from about 50% below to about 50% above the value of the total concentration of the corresponding principal acid in the target coffee divided by the total concentration of each of the corresponding N relevant acids in the target coffee. A value in the range of from about 40% below to about 40% above is preferred, a value in the range of from about 30% below to about 30% above is more preferred, a value in the range of from about 20% below to about 20% above is yet more preferred, a value in the range of from about 10% below to about 10% above is yet more preferred, and a value in the range of from about 5% below to about 5% above is most preferred.

The acceptable variation between the relative ratios of relevant acids in a first coffee (e.g., an adjusted coffee) and the relative ratios of the corresponding relevant acids in a second coffee (e.g., a target coffee) is a function of the particular coffees selected and the ability to perceive a particular acid by the sensory perception of taste. So, in order for the characteristic flavor profile of the first coffee to mimic the characteristic flavor profile of the second coffee, the pH of first coffee must be adjusted in such a way that the perceivable concentrations of relevant acids in the first coffee have substantially the same relative ratios to each other as the perceivable concentrations of corresponding relevant acids in the second coffee. When the pH of the first or adjusted coffee is within the range of about 2 units above to about 2 units below the pH of the second coffee (i.e., the target coffee), preferably in the range of from about 1 unit above to about 1 unit below, more preferably in the range of from about 0.5 units above to about 0.5 units below, most preferably in the range of from about 0.2 units above to about 0.2 units below, the two coffees will have sufficiently similar perceivable concentrations of the relevant acids such that the characteristic flavor profile of the first or adjusted coffee will sufficiently mimic the targeted characteristic flavor profile of the second coffee.

As the perceptible concentration of a given relevant acid is a function of that acid's pKa value and the overall pH value of the solution, addition of a sufficient amount of one or more coffee source component modifiers will adjust the perceptible concentration of the relevant acid through adjustment of the overall pH value. These conditions can be expressed as follows:

i) $(0.5)\,(P_{Second\ Coffee}) \leq (P_{First\ Coffee}) \leq (1.5)(P_{Second\ Coffee})$;

ii) $(0.5)\,[(P_{Second\ Coffee})/(R_{Second\ Coffee\ (n)})] \leq [(P_{First\ Coffee})/(R_{First\ Coffee\ (n)})] \leq (1.5)\,[(P_{Second\ Coffee})/(R_{Second\ Coffee(n)})]$, for each of n relevant acids;

iii) $pH_{First\ Coffee} = pH_{Second\ Coffee} \pm 2$ units where $P_{First\ Coffee}$ is the total concentration of the principal acid in the first coffee, $P_{Second\ Coffee}$ is the total concentration of the corresponding principal acid in the second coffee, $R_{First\ Coffee(n)}$ is the total concentration of the $n^{th}$ relevant acid in the first coffee, $R_{Second\ Coffee(n)}$ is the total concentration of the corresponding $n^{th}$ relevant acid in the second coffee, $pH_{First\ Coffee}$ is the pH value of the first coffee, and $pH_{Second\ Coffee}$ is the pH value of the second coffee.

Applicants have further found that as it is the relative ratios of the relevant acids to each other that defines the characteristic flavor profile for that given set of acids, the absolute magnitude of the difference between the total concentrations of relevant acids between a first coffee and a second coffee is less critical in determining if the characteristic flavor profile of the first coffee is sufficiently similar to that of a second coffee so as to mimic that coffee's flavor profile. So, in another embodiment of the present invention, Applicants have determined that for a characteristic flavor profile of a first set of relevant acids, such as would be found in an adjusted coffee (i.e., a coffee source that has been supplemented to mimic a target coffee), to be substantially similar to a characteristic flavor profile of a second set of relevant acids, such as would be found in a second or target coffee, so as to mimic that characteristic flavor profile of that second or target coffee, the total concentration of those relevant acids may be increased by as much as a factor of seven (7) (i.e., a magnitude adjustment factor of between 1-7), as long as the relative ratios of the total concentration of the principal acid of the adjusted coffee is within in the range of about 50% below to about 50% above the total concentration of the corresponding acid in the target coffee, adjusted by the total magnitude adjustment factor. A total concentration for the principal acid in the adjusted coffee within the range of from about 40% below to about 40% above the total concentration of the corresponding acid in the target coffee, adjusted by the total magnitude adjustment factor, is preferred, a total concentration in the range of about 30% below to about 30% above, adjusted by the total magnitude adjustment factor, is more preferred, a total concentration in range of from about 20% below to about 20% above, adjusted by the total magnitude adjustment factor, is yet more preferred, a total concentration in range of from about 10% below to about 10% above, adjusted by the total magnitude adjustment factor, is yet more preferred, and a total concentration in range of from about 5% below to about 5% above, adjusted by the total magnitude adjustment factor, is most preferred.

Additionally, the value of the total concentration of the principal acid of the adjusted coffee divided by the total concentration of each of the relevant acids of the adjusted coffee should still be within the range of from about 50% below to about 50% above the value of the total concentration of the corresponding principal acid in the target coffee divided by the total concentration of each of the corresponding relevant acids in the target coffee. In other words, for a given adjusted coffee that has N relevant acids, the value of the total concentration of the principal acid (i.e. the principal coffee component) of the adjusted coffee divided by the total concentration of each of the N relevant acids (i.e., the relevant coffee component) of the adjusted coffee is within the range of from about 50% below to about 50% above the value of the total concentration of the corresponding principal acid in the target coffee divided by the total concentration of each of the corresponding N relevant acids in the target coffee. A value in the range of from about 40% below to about 40% above is preferred, a value in the range of from about 30% below to about 30% above is more preferred, a value in the range of from about 20% below to about 20% above is yet more preferred, a value in the range of from about 10% below to about 10% above is yet more preferred, and a value in the range of from about 5% below to about 5% above is most preferred.

Finally, in order for a the characteristic flavor profile of the first coffee to mimic the characteristic flavor profile of the second coffee, the pH of first coffee must be adjusted in such a way that the perceivable concentrations of relevant acids in the first coffee have substantially the same relative ratios to each other as the perceivable concentrations of corresponding relevant acids in the second coffee. When the pH of the first or adjusted coffee is within the range of about 2 units above to about 2 units below the pH of the second coffee (i.e., the target coffee), preferably in the range of from about 1 unit above to about 1 unit below, more preferably in the range of from about 0.5 units above to about 0.5 units below, most preferably in the range of from about 0.2 units above to about 0.2 units below, the two coffees will have sufficiently similar perceivable concentrations of the relevant acids such that the characteristic flavor profile of the first or adjusted coffee will sufficiently mimic the targeted characteristic flavor profile of the second coffee. As the perceptible concentration of a given relevant acid is a function of that acid's pKa value and the overall pH value of the solution, addition of a sufficient amount of one or more coffee source component modifiers will adjust the perceptible concentration of the relevant acid through adjustment of the overall pH value. These conditions can be expressed as follows:

i) $(M)\,(0.5)\,(P_{Second\ Coffee}) \leq (P_{First\ Coffee}) \leq (M)\,(1.5)\,(P_{Second\ Coffee})$;

ii) $(0.5)\,[(P_{Second\ Coffee})/(R_{Second\ Coffee(n)})] \leq [(P_{First\ Coffee})/(R_{First\ Coffee(n)})] \leq (1.5)\,[(P_{Second\ Coffee})/(R_{Second\ Coffee(n)})]$, for each of n relevant acids;

iii) $pH_{First\ Coffee} = pH_{Second\ Coffee} \pm 2$ units where M is the magnitude adjustment factor and has a value in the range of from about 1 to about 7, $P_{First\ Coffee}$ is the total concentration of the principal acid in the first coffee, $P_{Second\ Coffee}$ is the total concentration of the corresponding principal acid in the second coffee, $R_{First\ Coffee(n)}$ is the total concentration of the $n^{th}$ relevant acid in the first coffee, $R_{Second\ Coffee(n)}$ is the total concentration of the corresponding $n^{th}$ relevant acid in the second coffee, $pH_{First\ Coffee}$ is the pH value of the first coffee, and $pH_{Second\ Coffee}$ is the pH value of the second coffee.

In one particularly preferred embodiment of the present invention the total concentration of the principal acid of the adjusted coffee is within in the range of about 50% below to about 50% above the total concentration of the corresponding acid in the target coffee, adjusted by the total magnitude adjustment factor; the value of the total concentration of the principal acid of the adjusted coffee divided by the total concentration of each of the relevant acids of the adjusted coffee is within the range of from about 50% below to about 50% above the value of the total concentration of the corresponding principal acid in the target coffee divided by the total concentration of each of the corresponding relevant acids in the target coffee; the pH of the first or adjusted coffee is within the range of about 2 units above to about 2 units below the pH of the second coffee (i.e., the target coffee); and, the value of the total concentration of the principal acid of the adjusted coffee divided by the total concentration of each of the relevant acids of the adjusted coffee is equal to the value of the total concentration of the principal acid of the target coffee divided by the total concentration of each of corresponding relevant acids in the target coffee. The last condition can be restated as the relative ratios of the principal and other relevant acids in the adjusted coffee to each other is equal to the relative ratios of the principal and other relevant acids in the target coffee to each other.

The conditions for this embodiment of the present invention can be expressed as follows:

i) $(M)$ $(0.5)$ $(P_{Second\ Coffee}) \leq (P_{First\ Coffee}) \leq (M)$ $(1.5)$ $(P_{Second\ Coffee})$;

ii) $(0.5)$ $[(P_{Second\ Coffee})/(R_{Second\ Coffee(n)})] \leq [(P_{First\ Coffee})/(R_{First\ Coffee(n)})] \leq (1.5)$ $[(P_{Second\ Coffee})/(R_{Second\ Coffee(n)})]$, for each of n relevant acids;

iii) $pH_{First\ Coffee} = pH_{Second\ Coffee} \pm 2$ units;

iv) $[(P_{First\ Coffee})/(R_{First\ Coffee(n)})] = [(P_{Second\ Coffee})/(R_{Second\ Coffee(n)})]$ or alternatively as, $[P_{First\ Coffee}]$ $[R_{First\ Coffee}\ (1)]: \ldots : [R_{First\ Coffee(n)}] = [P_{Second\ Coffee}]: [R_{Second\ Coffee(1)}]: \ldots : [R_{Second\ Coffee(n)}]$.

where M is the magnitude adjustment factor and has a value in the range of from about 1 to about 7, $P_{First\ Coffee}$ is the total concentration of the principal acid in the first coffee, $P_{Second\ Coffee}$ is the total concentration of the corresponding principal acid in the second coffee, $R_{First\ Coffee(n)}$ is the total concentration of the $n^{th}$ relevant acid in the first coffee, $R_{Second\ Coffee(n)}$ is the total concentration of the corresponding $n^{th}$ relevant acid in the second coffee, $pH_{First\ Coffee}$ is the pH value of the first coffee, and $pH_{Second\ Coffee}$ is the pH value of the second coffee.

One embodiment of the present invention comprises the following steps. First, a coffee source is selected and coffee source components are identified. A coffee source component profile is then acquired by the method described herein showing the total concentration of the coffee source components. The same process is done for the coffee element of a target coffee, though it will be appreciated upon viewing the disclosure herein that the step of determining the target coffee's flavor profile does not have to be contemporaneous with the acquisition of the flavor profile of the coffee source.

Subsequently, the concentrations of the coffee source components in the coffee source component profile are compared to the concentrations of the corresponding target coffee components in the target coffee component profile. The relevant and principal components are then identified.

The concentrations of the relevant coffee source components are then supplemented with corresponding supplemental coffee source components. The supplemental coffee source components add sufficient quantities of the corresponding taste contributing acids to a coffee portion of the coffee beverage or composition, such that the relative concentration ratios of the resulting coffee component (e.g., the sum of the coffee source component and a corresponding supplemental coffee source component) approximates the relative concentration ratios of the target coffee components, within acceptable variances. This ensures that if the resulting coffee and the target coffee were measured at the same pH value they would have a substantially similar perceived flavor profile, thereby mimicking the flavor profile of the target coffee and delivering the same perceived flavor note and intensity of the acids.

The coffee beverage or composition comprising the resulting coffee can then be prepared in any consumer preferred fashion (e.g., as a cappuccino or latte, black, chilled, as a flavorant in another food or beverage product, etc.). If the pH of the coffee beverage or composition comprising the resulting coffee is within an acceptable range of the pH value of the coffee element of the target coffee, then the resulting coffee will have a flavor profile that behaves substantially similarly to the flavor profile of the coffee element of the target coffee. The concentration of the associated forms of the acids in each will approximate or mimic each other and behave similarly in response to changes in pH values. The pH value of all substances is measured at standard temperature and pressure, herein after referred to as STP (25° C., 760 mmHg).

k. Profile Mimicking and Adjustment of Aged Coffees

As described herein Applicants have found it is possible to overcome the dispreferred flavor effects of the aging process employing processes whereby the flavor profile of an aged coffee (i.e., a coffee source) is adjusted to approximate or mimic the flavor profile of the corresponding, non-aged coffee (i.e., a target coffee). It has also been discovered that the flavor profile of an aged coffee may be adjusted so as to approximate or mimic the flavor profile of a non-corresponding coffee as well.

In one embodiment of the present invention a coffee source is provided in the form of a brewed roast and ground coffee. The coffee source component profile of the freshly brewed roast and ground coffee is determined and retained for future use as a target coffee component profile. Upon brewing, the brewed coffee source begins to age. Applicants have found that the speed of the aging process is highly correlated to temperature (e.g., coffees will age faster at higher temperatures). At a point prior to consumption the coffee source component profile of the aging coffee is determined according to the method described herein. The coffee source component profile of the aging coffee is compared to a target coffee component profile, which in this embodiment is the coffee source component profile of the freshly brewed roast and ground coffee. A suitable coffee source component modifier is selected and added to the aging coffee so as to shift the equilibrium in favor of the dissociated forms of the acids contained therein, thereby making the acids less perceptible to the sensory perception of taste. Sufficient amounts of suitable supplemental coffee source components are then added so as to appropriately mimic the flavor profile of the corresponding, non-aged coffee. It will be appreciated by the ordinarily skilled artisan upon reading the disclosure herein that the process of mimicking the target coffee could have occurred immediately prior to consumption, or alternatively could have occurred some period of time prior to consumption.

Even after the flavor profile of a non-aged coffee has been mimicked in an aged coffee the aging process continues. Applicants have discovered that the process of mimicking the flavor profile of a non-aged coffee, however, may be employed more than once. In another embodiment of the present invention a brewed roast and ground coffee source is provided that has a six hour hold-time. At a point 2 hours into the hold time of the aging coffee, a suitable coffee source component modifier is selected and added to the aging coffee so as to shift the equilibrium in favor of the dissociated forms of the acids contained therein, thereby making the acids less perceptible to the sensory perception of taste. Then sufficient amounts of suitable supplemental coffee source components are added so as to appropriately mimic the flavor profile of the corresponding, non-aged coffee. This process is repeated at a point four hours into the hold-time of the coffee. Though the aging of the coffee continues following the mimicking process, the starting point for aging is effectively reset to that of the fresh brewed coffee. Therefore, in the present embodiment a brewed coffee that is six hours old may be provided that has a flavor profile of a corresponding two hour old coffee. It will be appreciated by the ordinarily skilled artisan upon reading the disclosure herein that this process is not limited in the number of times it may be repeated.

Applicants have further discovered that it is possible to adjust the flavor profile of a coffee source in such a way as to acceptably approximate or mimic the flavor profile of a freshly brewed coffee over a period of time. The period of time may be defined as the acceptable hold-time of a given coffee, or alternatively may be defined as the period of time in which a certain amount of aging would occur in a given coffee source were left unadjusted.

In yet another embodiment of the present invention a concentrated liquid coffee extract is provided as a coffee source. The coffee source component profile of a freshly extracted coffee is determined and retained for future use as a target coffee component profile. Based on a previously determined understanding of how the flavor profile of the coffee source changes over time, developed from repeated flavor profile examinations, a suitable coffee source component modifier is selected and added to the aging coffee so as to shift the equilibrium in favor of the dissociated forms of the acids contained therein. This has the result of making the acids less perceptible to the sensory perception of taste. Then sufficient amounts of suitable supplemental coffee source components are added so as to appropriately mimic the flavor profile of the corresponding, non-aged coffee over a period of time, which in the present embodiment is eight weeks.

As stated previously the target coffee may optionally be a non-aged, non-corresponding coffee. In yet another embodiment of the present invention a liquid coffee extract is provided as a coffee source. The coffee source component profile of a freshly brewed roast and ground coffee is determined and retained for future use as a target coffee component profile. A suitable coffee source component modifier is selected and added to the aging coffee so as to shift the equilibrium in favor of the dissociated forms of the acids contained therein. This has the result of making the acids less perceptible to the sensory perception of taste. Then sufficient amounts of suitable supplemental coffee source components are added so as to appropriately mimic the flavor profile of the freshly brewed roast and ground coffee (i.e., non-corresponding, non aged coffee) over a period of time, which in the present embodiment is ten weeks.

L. Preparation of Coffee Beverages and Compositions

Figure 4:
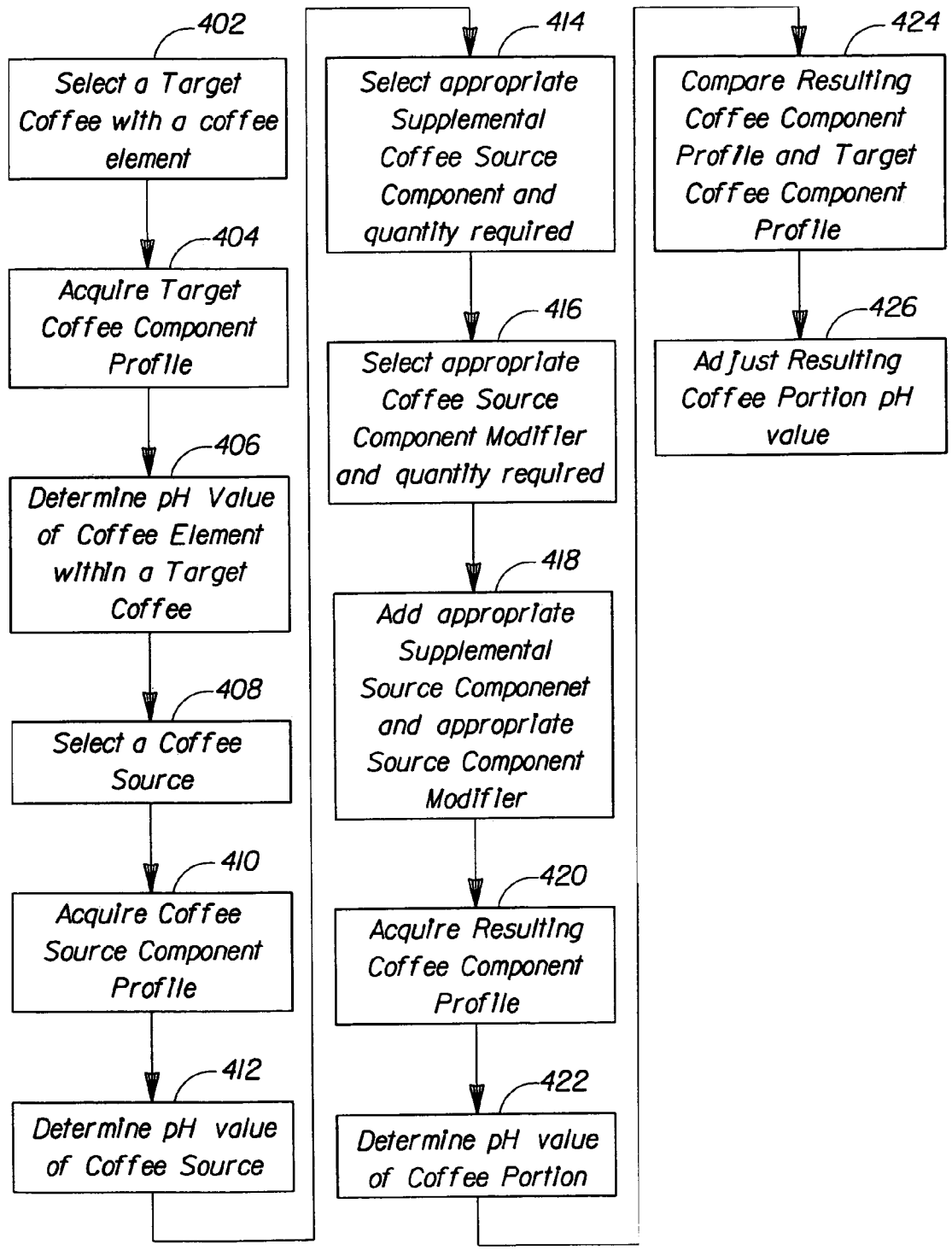
FIG. 4 Is a flow diagram describing the process steps of one embodiment of the present invention.

FIG. 4 is a flow diagram of the process steps of one embodiment of the present invention of the present invention. Referring to the FIG. 4, step 402 is selecting a target coffee beverage comprising a target coffee element. The target coffee element can be in a variety of forms such as cherries, beans, leaves, and bark. Additionally, the coffee element can take the form of soluble coffee, roast and ground, roasted whole bean, green coffee, and extracts of coffee via aqueous, super-critical fluid, and organic solvent extraction processes. The coffee element can also be caffeinated, decaffeinated, or a blend of both.

The target coffee beverage may optionally contain additional elements, such as foaming agents, mouthfeel enhancing agents, flavorants, creamy components, inert fillers and carriers, sweetening agents, and the like.

Step 404 is acquiring the target coffee component profile showing the concentration of the relevant target coffee components. Step 406 is determining the pH value of the coffee element of the target coffee. The pH value is measured at standard temperature and pressure. One skilled in the art will appreciate that though the target coffee element of the target coffee beverage might have a given pH value, the pH value of the target coffee beverage as a whole might be different, depending on the presence of additional elements.

Step 408 is selecting a suitable coffee source. The coffee source can be in a variety of forms such as cherries, beans, leaves, and bark. Additionally, the coffee source can take the form of soluble coffee, roast and ground, roasted whole bean, green coffee, and extracts of coffee via aqueous, super-critical fluid, and organic solvent extraction processes. The coffee source can also be caffeinated, decaffeinated, or a blend of both. Step 410 is acquiring the coffee source component profile showing the concentration of the relevant coffee source components. Step 412 is to determine the pH value of the coffee source. The pH value is measured at standard temperature and pressure.

Step 414 is selecting the appropriate supplemental coffee source component or components corresponding to one or more relevant coffee source components and target coffee components and the amount required, if any, to appropriately modify the coffee source component profile. The quantity of supplemental coffee source component required is determined by the difference between the total concentration of the coffee source component and the target coffee component. The amount required is also determined by the amount of supplemental coffee source components required, if any, such that the resulting coffee component profile of relevant resulting coffee source components will be substantially similar to the target coffee component profile of corresponding acids, so that the resulting coffee component will sufficiently mimic the characteristic flavor of the target coffee element. If the total concentration of the coffee source component is less than the total concentration of the target coffee component, a sufficient amount of a supplemental coffee source component is added so that the total concentration of the resulting coffee source component is within the acceptable range of the total concentration of the target coffee component. If the total concentration of the coffee source component is in excess of the total concentration of the target coffee component, then the addition of a supplemental coffee source component is not necessarily required. However, if the concentration of all relevant coffee components is to be increased by some magnification adjustment factor the use of a supplemental coffee source component may be required.

Step 416 is selecting the appropriate coffee source component modifier, and the amount required to sufficiently adjust the perceptible concentration of the resulting coffee source component so that it is within the acceptable range of the pH value of the corresponding target coffee component. This will allow the characteristic flavor profile of the resulting coffee portion to suitably mimic the characteristic flavor profile of the target coffee element. The amount of coffee source component modifier required depends, in part, on the coffee source and the coffee element of the target coffee selected.

Step 418 is formulating the resulting coffee portion by combining the selected supplemental coffee source components and the coffee source component modifier, if required, with the coffee source. As described above, the supplemental coffee source component and coffee source component modifier can exist and be applied in a variety of forms. Moreover, the application of the supplemental coffee source components and coffee source component modifier does not have to occur at the same moment. Additionally, the components can be applied at any point in the preparation of the coffee beverages or compositions of the present invention. They may also be combined with the coffee source, either together or individually, during the formation of any intermediate product used in the creation of the coffee beverages or compositions of the present invention.

Depending on the coffee source selected, the supplemental coffee source components and the coffee source component modifier, if required, can be delivered to the coffee beverages or compositions of the present invention: by a machine or other dispensing apparatus; by impregnating the ingredients in the lining of a cup; by impregnating the ingredients in a filter; by pre-measured tablet or packet; and, through the water used in various stages of product preparation (e.g., the roasting quench used to cool a post-roasted coffee, or the water used to create the final, consumable coffee beverage). The components and modifiers may also be introduced via spraying, coating, soaking, co-mixing, or other suitable method.

If the coffee source is an agglomerated instant coffee product, for example, the components and modifiers of the present invention could be combined with the coffee source via part of an agglomeration binding solution (e.g., carbohydrate and/or starch, water, or other suitable surfactant); in a dry form that be part of the agglomeration; sprayed onto the agglomerated particle in liquid form; or, coated to an otherwise physically inert ingredient (e.g., sucrose, maltodextrin).

It will be appreciated by one skilled in the art upon reading the disclosure herein that one or more of the following steps may be omitted entirely or possibly performed on a periodic basis, possibly as part of a quality control program. Depending on the accuracy of the analytical data obtained on the various component profiles and the exact amount of supplemental coffee source component(s) and/or coffee source component modifier(s) added, the resulting coffee component profile and/or the pH value of the resulting coffee portion of the finished beverage can be calculated with sufficient accuracy to practice the present invention.

Step 420 is acquiring the resulting coffee component profile showing the total concentration of the resulting coffee source components. Step 422 is determining the pH value of the coffee portion of the resulting coffee beverage. The pH value is measured at standard temperature and pressure. Steps 424 and 426 require validating the results by comparing the resulting coffee component profile with the target coffee component profile and ensuring that the coffee portion is within an acceptable pH range of the coffee element of the target coffee.

One skilled in the art will appreciate that each and every step of the method described above is not required for every execution of the present invention. The exact sequence and number of steps required is also dependent on the particular execution of the present invention employed.

M. Analytical Methods

Method for Determination of Coffee Components

The coffee components of the present invention are separated and quantified by Ion Chromatography (IC) utilizing alkaline anion-exchange with conductivity detection. The system is a Dionex DX 500 Ion Chromatograph comprising:
i) IP25 Isocratic Pump;
ii) EG-40 Eluent Generator;
iii) Ion Pac ATC-1 anion-trap PN#37151;
iv) AS50 Autosampler;
v) LC30 Chromatography Oven;
vi) Ion Pac AS-11HC column (4 mm×20 cm) (PN 052960);
vii) Ion Pac AG-11—HC(PN 052962) guard column;
viii) CD20 Conductivity Detector; and,
ix) 4 mm ASRS-Ultra suppressor.

The chromatographic column consists of a 9-μm highly cross-linked macroporous ethylvinylbenzene-divinylbenzene resin core with 70-nm diameter microbeads of anion-exchange latex attached to the surface. The mobile phase is electrolytically generated from distilled-deionized water by using a Dionex EG-40 Eluent Generator and is characterized as follows:

1. Eluent A: 18 Mohm-cm Milli-Q water or better, filtered through a 0.45 mm filter, degassed, and transferred to reservoir A with a continuous blanket of nitrogen.

2. Eluent B: Potassium Hydroxide Cartridge (EluGen EGC-KOH EluGen cartridge, Dionex Inc.)

Deionized water is delivered by the pump to the EluGen Cartridge in the EG40. DC current is applied to the EluGen Cartridge to produce potassium hydroxide eluent. The resulting mobile phase gradient is described in Table 2 below.)

TABLE 2

| time (min) | [NaOH] (mM) | Ramp |
|---|---|---|
| 0 | 1 | |
| 15 | 1 | isochratic |
| 25 | 15 | linear |
| 35 | 30 | linear |
| 60 | 60 | linear |

The column is kept at a temperature of 32° C. The flow rate is 1.5 mL/min and the injection volume is 10 μL. The data collection time is 55 minutes at a data collection rate of 5 points per second.

The above described analytical method is further disclosed in Dionex Corporation Application Note 123, "Determination of Inorganic Anions and Organic Acids in Fermentation Broths" and, Dionex Corporation Application Note 25, "Determination of Inorganic Anions and Organic Acids in Non-Alcoholic Carbonated Beverages", herein incorporated by reference.

The first step in the method for the identification, separation, and quantification of coffee components is to prepare an aqueous sample solution of the substance to be analyzed (coffee source, target coffee, or coffee portion). The aqueous sample solution must then be filtered to remove large suspended solids. A purified sample is then collected and analyzed using the above equipment.

By way of example, if the substance to be analyzed is a roast and ground coffee then first weigh 2.0 grams of R&G into a 100 ml volumetric flask. Add 50 ml of boiling HPLC water to the sample and boil on a hot plate for 10 minutes. Cool to room temperature and bring to volume with HPLC water. Then filter 2 ml through a 0.45 mm Nylon Membrane filter (acrodisc). Discard the first 1 ml and collect the second 1 ml in a sample vial and cap. Finally, analyze the purified sample using the above described equipment.

If the substance to be analyzed is a brewed coffee then filter approximately 2 ml through a 0.45 mm Nylon Membrane filter (acrodisc). Discard the first 1 ml and collect the second 1 ml in a sample vial and cap. Finally, analyze the purified sample using the above described equipment.

If the substance to be analyzed is a soluble coffee then weigh 1 gram of the soluble coffee into a 100 ml volumetric flask. Add 50 ml of boiling HPLC water to the sample. Swirl the solution to mix well, then cool and dilute to volume. Then filter 2 ml through a 0.45 mm Nylon Membrane filter (acrodisc). Discard the first 1 ml and collect the second 1 ml in a sample vial and cap. Finally, analyze the purified sample using the above described equipment.

If the substance to be analyzed is a coffee extract then it will need to be diluted in order to pass through the 0.45 mm Nylon Membrane filter (acrodisc). The extent of the dilution is dependent upon the viscosity of the particular sample to be analyzed. If the sample to be analyzed is in a form other than described above it will need to be prepared as outlined above. Samples that will not be analyzed shortly following preparation require refrigeration.

Calibration of the Ion Chromatography Method

One skilled in the art will appreciate that calibration is necessary to convert detector response to measures of concentration (e.g., parts per million, milligrams per liter, and the like). Calibration of the IC method is performed by preparing solutions of the free acids (when available as solids of sufficient purity) or of the sodium or potassium salts. Response factors (RF, ppm/peak area) were determined by a five level calibration for quinic, lactic, acetic, formic, malic, phosphoric and citric acids. Where the salts were used, gravimetric factors were applied such that the RF values corresponded to free acid concentration (ppm).

Quinic Acid

Quinic acid (Aldrich 77-95-2, 98% pure, FW=192.17 g/mol) was used. A primary stock solution was prepared by weighing 0.1015 g into a 100 mL volumetric flask. A secondary stock was prepared by 10-fold dilution. Five calibration solutions were made by successive 2-fold dilutions of the secondary stock. The fit was linear ($r^2$=0.9998) over a 6 to 100 ppm range.

Lactic Acid

Sodium lactate (Sigma L-7022, approx. 98% pure, FW=112.06 g/mol) was dried overnight in a desiccator containing $CaSO_4$. A primary stock solution was prepared by weighing 0.1079 g into a 100 mL volumetric flask. A secondary stock was prepared by 10-fold dilution. Five calibration solutions were made by successive 2-fold dilutions of the secondary stock. The fit was linear ($r^2$=0.9996) over a 5 to 85 ppm range.

Acetic Acid

Sodium acetate (Sigma S7545, 99.0% pure, FW=82.03 g/mol) was used. A primary stock solution was prepared by weighing 0.1035 g into a 100 mL volumetric flask. A secondary stock was prepared by 10-fold dilution. Five calibration solutions were made by successive 2-fold dilutions of the secondary stock. A quadratic fit ($r^2$=0.9999) was preferred to a linear fit ($r^2$=0.984) over the 5 to 75 ppm range.

Formic Acid

Sodium formate (Sigma S2140, 99.6% pure, FW=68.01 g/mol) was used. A primary stock solution was prepared by weighing 0.1007 g into a 100 mL volumetric flask. A secondary stock was prepared by 10-fold dilution. Five calibration solutions were made by successive 2-fold dilutions of the secondary stock. The fit was linear ($r^2$=0.9990) over a 4 to 70 ppm range.

Malic Acid

Malic acid (Aldrich 617-48-1, 99+% pure, FW=134.09 g/mol) was used. A primary stock solution was prepared by weighing 0.1020 g into a 100 mL volumetric flask. A secondary stock was prepared by 10-fold dilution. Five calibration solutions were made by successive 2-fold dilutions of the secondary stock. A quadratic fit ($r^2$=0.9999) was preferred to a linear fit ($r^2$=0.985) over the 6 to 100 ppm range.

Phosphoric Acid

Potassium phosphate, monobasic (Aldrich 7778-77-0, 99% pure, FW=136.09 g/mol) was used. A primary stock solution was prepared by weighing 0.1020 g into a 100 mL volumetric flask. A secondary stock was prepared by 10-fold dilution. Five calibration solutions were made by successive 2-fold dilutions of the secondary stock. Fit was linear ($r^2$=0.9999) over a 5 to 75 ppm range.

Citric Acid

Citric acid (Aldrich 77-92-9, 99+% pure, FW=192.12 g/mol) was used. A primary stock solution was prepared by weighing 0.1034 g into a 100 mL volumetric flask. A secondary stock was prepared by 10-fold dilution. Five calibration solutions were made by successive 2-fold dilutions of the secondary stock. A quadratic fit ($r^2$=0.9999) was preferred to a linear fit ($r^2$=0.989) over the 6 to 100 ppm range.

N. Examples

The following examples further describe and demonstrate embodiments within the scope of the present invention. These examples are given solely for the purpose of illustration and are not to be construed as a limitation of the present invention, as many variations thereof are possible without departing from the invention's spirit and scope.

Preparation of Coffee Source Components and Coffee Source Component Modifiers

Stock 1 molar solutions are prepared for each of sodium hydroxide, potassium hydroxide, di-sodium malate, tri-potassium citrate, tri-sodium citrate, di-potassium phosphate, malic acid, citric acid, phosphoric acid, lactic acid, formic acid, and acetic acid. For each individual example, the appropriate materials were either pre-mixed and then added to the coffee source or added to the coffee source using VWR model 990A1925 and BIOHT model AR71005 pipettes.

Example 1

A roast and ground coffee is prepared comprising 60% by weight of a first coffee and 40% by weight of a second coffee. The first coffee comprises a Central American Arabicas roasted to a Hunter color of 15.6 L. The second coffee is a blend of 75% arabicas and 25% robustas. The 75/25 arabica/robusta blend is roasted to a target Hunter color of 16.5 L. The first coffee and the second coffee are blended together and subsequently ground to an average particle size of 724 microns.

A coffee source comprising a liquid coffee extract is prepared from the roast and ground coffee above. An extraction column is filled with 6.5 kg of the prepared roast and ground coffee source. Suitable coffee extraction columns include, but are not limited to, continuous flow columns. Said columns are typically stainless steel vertical columns having a height-to-diameter ratio greater than or equal to 6:1 and a perforated top and bottom retainer to permit the transport of feed water while simultaneously keeping coffee granules between the retainers. Suitable columns can be obtained from Niro A/S of Soeborg, Denmark. The column is flushed with nitrogen and then extracted with distilled, dearated water at the rate of 1.8 liters/minute at 180° F. The extract is cooled to 85° F. after exiting the column. The extract has a solids level of 3.89% by weight.

The coffee source comprising a liquid coffee extract is diluted to 0.7% solids by weight using distilled water and a coffee source component profile is determined per the analytical method described herein. The coffee source component profile and relative concentration ratios are shown in Table 3.1.

TABLE 3.1

| Coffee Source Component | Malic Acid | Citric Acid |
|---|---|---|
| Concentration, ppm: | 49.9 | 120.1 |
| Relative Ratios | 1 | 2.41 |

The pH of the liquid extract coffee source is measured using an ORION model 290A pH meter. The pH is observed to be 5.062. The coffee source comprising a liquid coffee extract is heated in a MicroThermics Model 25DH UHT/HTST unit using a preheat temperature of 180° F., a flow rate of 2 liters/minute, a hold temperature of 290° F. for a hold time of 6 seconds. The liquid coffee extract is cooled to a temperature of 45° F. and packed into bottles.

Into each bottle, a coffee source component profile modifier (sodium hydroxide) and supplemental coffee source components for the relevant acids are added. The amount and species of the coffee source component profile modifier and the supplemental coffee source components added are shown in Table 3.2. The resulting coffee source component profile for the relevant acids, and the relative concentration ratios for those acids are also shown in Table 3.3.

TABLE 3.2

|  | NaOH | malic | citric |
|---|---|---|---|
| Flavor Profile Modifier (NaOH) | 199.5 |  |  |
| Supplemental Coffee Source Components (added in acid form) |  | 66.6 | 191.3 |
| Total Species Contribution |  | 66.6 | 191.3 |

Following the addition of the coffee source component profile modifier and the supplemental coffee source components the pH of the coffee is measured to be 5.488. The bottles are then placed in an 85° F. controlled temperature room that is monitored by a Partlow model MRC 5000 temperature control system for two weeks. At the conclusion of two weeks, the bottles are removed, and the pH of the coffee is measured to be 5.133. The resulting coffee source component profile and the relative concentration ratios of the resulting coffee source components is determined. Their values appear in Table 3.3. The resulting coffee source component profile is compared to the target coffee source component profile and the differences are also shown in Table 3.3.

TABLE 3.3

|  | pH | malic | citric |
|---|---|---|---|
| Resulting Coffee Source Component Profile | 5.133 | 116.5 | 311.4 |
| Relative Ratio of Acids (A) in Resulting Coffee Source Component Profile |  | 1 | 2.67 |
| Target Coffee Source Component Profile |  | 49.9 | 120.1 |
| Relative Ratio of Acids (A) in Target Coffee Source Component Profile |  | 1 | 2.41 |
| Difference of relative ratio values between an acid in the target profile and the corresponding acid in the resulting profile. | 0.071 | 0 | 0.26 |
| Relative concentration ratio of acid in resulting profile/Relative concentration ratio of corresponding acid in target profile. |  | 1 | 1.11 |

The concentrations of the perceptible forms of the relevant acids in the resulting coffee and the target coffee are calculated using the same pH value of 5.062 (the pH value of the freshly extracted coffee source). The perceptible concentrations in the resulting coffee are found to be at least as great as the perceptible concentrations of the corresponding relevant acids in the in the target coffee (i.e., the freshly extracted coffee source).

Example 2

The liquid extract coffee source of Example 1 is utilized. The coffee source is diluted to 0.7% solids by weight using distilled water and a coffee source component profile is determined per the analytical method described herein. The coffee source component profile and relative concentration ratios are shown in Table 4.1.

TABLE 4.1

|  | malic | citric | phosphoric | formic | lactic |
|---|---|---|---|---|---|
| Coffee Source Component Profile | 49.9 | 120.1 | 37.2 | 50.3 | 18.6 |
| Relative Concentration Ratios | 1 | 2.41 | 0.75 | 1.01 | 0.37 |

The pH of the liquid extract coffee source is measured using an ORION model 290A pH meter. The pH is observed to be 5.059. The coffee source is heated in a MicroThermics Model 25DH UHT/HTST unit using a preheat temperature of 180° F., a flow rate of 2 liters/minute, a hold temperature of 290° F. for a hold time of 6 seconds. The liquid coffee extract is cooled to a temperature of 45° F. and packed into bottles. Two 10 gram aliquots are taken and placed into scintillation vials.

Into each vial, a coffee source component profile modifier (sodium hydroxide) and supplemental coffee source components for the identified relevant acids are added. The amount and species of the coffee source component profile modifier and the supplemental coffee source components added are shown in Table 4.2. The resulting coffee source component profile for the relevant acids, and the relative concentration ratios for those acids are shown in Table 4.3.

TABLE 4.2

|  | NaOH | malic | citric | phosphoric | formic | lactic |
|---|---|---|---|---|---|---|
| Flavor Profile Modifier | 83.6 |  |  |  |  |  |
| Supplemental Coffee Source Components, acid form |  | 15.4 | 37 | 11.6 | 15.3 | 5.6 |
| Supplemental Coffee Source Components - salt form |  | 39.3 | 94.5 | 29.5 |  |  |
| Total Species Contribution |  | 54.7 | 131.5 | 41.1 | 15.3 | 5.6 |

Following the addition of the flavor profile modifier and the supplemental coffee source components the pH of the aliquots is measured to be 5.439. The vials are then placed in an 85° F. controlled temperature room that is monitored by a Partlow model MRC 5000 temperature control system for two weeks. At the conclusion of two weeks, the vials are removed, and the pH of the aliquots are measured to be 5.059. The resulting coffee source component profile and the relative concentration ratios of the resulting coffee source components is determined. Their values appear in Table 4.3. The resulting coffee source component profile is compared to the target coffee source component profile and the differences are also shown in Table 4.3.

TABLE 4.3

|  | NaOH | malic | citric | phosphoric | formic | lactic |
|---|---|---|---|---|---|---|
| Resulting Coffee Source Component Profile | 5.084 | 104.6 | 251.6 | 78.3 | 65.6 | 24.2 |
| Relative Ratio of Acids (A) in Resulting Coffee Source Component Profile |  | 1 | 2.41 | 0.75 | 0.63 | 0.23 |
| Target Coffee Source Component Profile |  | 49.9 | 120.1 | 37.2 | 50.3 | 18.6 |
| Relative Ratio of Acids (A) in Target Coffee Source Component Profile |  | 1 | 2.41 | 0.75 | 1.01 | 0.37 |
| Difference of relative ratio values between an acid in the target profile and the corresponding acid in the resulting profile. | 0.025 | 0 | 0 | 0 | −0.38 | −0.14 |
| Relative concentration ratio of acid in resulting profile/ Relative concentration ratio of corresponding acid in target profile. |  | 1 | 1 | 1 | 0.62 | 0.62 |

The concentrations of the perceptible forms of the relevant acids in the resulting coffee and the target coffee are calculated using the same pH value of 5.059 (the pH value of the freshly extracted coffee source). The perceptible concentrations in the resulting coffee are found to be at least as great as the perceptible concentrations of the corresponding relevant acids in the in the target coffee (i.e., the freshly extracted coffee source).

Example 3

The liquid extract coffee source of Example 1 is utilized. The coffee source is diluted to 0.7% solids by weight using distilled water and a coffee source component profile is determined per the analytical method described herein. The coffee source component profile and relative concentration ratios are shown in Table 5.1.

TABLE 5.1

|  | malic | citric | phosphoric | formic | lactic |
|---|---|---|---|---|---|
| Coffee Source Component Profile | 49.9 | 120.1 | 37.2 | 50.3 | 18.6 |
| Relative Concentration Ratios | 1 | 2.41 | 0.75 | 1.01 | 0.37 |

The pH of the liquid extract coffee source is measured using an ORION model 290A pH meter. The pH is observed to be 5.059. The coffee source is heated in a MicroThermics Model 25DH UHT/HTST unit using a preheat temperature of 180° F., a flow rate of 2 liters/minute, a hold temperature of 290° F. for a hold time of 6 seconds. The liquid coffee extract is cooled to a temperature of 45° F. and packed into bottles. Two 10 gram aliquots are taken and placed into scintillation vials.

Into each vial, a coffee source component profile modifier (sodium hydroxide) and supplemental coffee source components for the identified relevant acids are added. The amount and species of the coffee source component profile modifier and the supplemental coffee source components added are shown in Table 5.2. The resulting coffee source component profile for the relevant acids, and the relative concentration ratios for those acids are shown in Table 5.3.

TABLE 5.2

|  | NaOH | malic | citric | phosphoric | formic | lactic |
|---|---|---|---|---|---|---|
| Flavor Profile Modifier | 59.7 |  |  |  |  |  |
| Supplemental Coffee Source Components, acid form |  | 14.6 | 29.2 | 13.1 | 16.3 | 6.6 |
| Supplemental Coffee Source Components - salt form |  | 39.3 | 69.1 | 39.5 |  |  |
| Total Species Contribution |  | 53.9 | 98.3 | 52.6 | 16.3 | 6.6 |

Following the addition of the coffee source component profile modifier and the supplemental coffee source components the pH of the aliquots is measured to be 5.426. The vials are then placed in an 85° F. controlled temperature room that is monitored by a Partlow model MRC 5000 temperature control system for two weeks. At the conclusion of two weeks, the vials are removed, and the pH of the aliquots are measured to be 5.148. The resulting coffee source component profile and the relative concentration ratios of the resulting coffee source components is determined. Their values appear in Table 5.3. The resulting coffee source component profile is compared to the target coffee source component profile and the differences are also shown in Table 5.3.

TABLE 5.3

|  | pH | malic | citric | phosphoric | formic | lactic |
|---|---|---|---|---|---|---|
| Resulting Coffee Source Component Profile | 5.148 | 103.8 | 218.4 | 89.8 | 66.6 | 25.2 |
| Relative Ratio of Acids (A) in Resulting Coffee Source Component Profile |  | 1 | 2.1 | 0.87 | 0.64 | 0.24 |
| Target Coffee Source Component Profile |  | 49.9 | 120.1 | 37.2 | 50.3 | 18.6 |
| Relative Ratio of Acids (A) in Target Coffee Source Component Profile |  | 1 | 2.41 | 0.75 | 1.01 | 0.37 |
| Difference of relative ratio values between an acid in the target profile and the corresponding acid in the resulting profile. |  | 0 | −0.31 | +0.12 | −0.67 | −0.13 |
| Relative concentration ratio of acid in resulting profile/ Relative concentration ratio of corresponding acid in target profile. |  | 1 | 0.87 | 1.16 | 0.63 | 0.65 |

The concentrations of the perceptible forms of the relevant acids in the resulting coffee and the target coffee are calculated using the same pH value of 5.059 (the pH value of the freshly extracted coffee source). The perceptible concentrations in the resulting coffee are found to be at least as great as the perceptible concentrations of the corresponding relevant acids in the in the target coffee (i.e., the freshly extracted coffee source).

Example 4

The liquid extract coffee source of Example 1 is utilized. The coffee source is diluted to 0.7% solids by weight using distilled water and a coffee source component profile is determined per the analytical method described herein. The coffee source component profile and relative concentration ratios are shown in Table 6.1.

TABLE 6.1

|  | malic | citric | phosphoric | formic | lactic |
|---|---|---|---|---|---|
| Coffee Source Component Profile | 49.9 | 120.1 | 37.2 | 50.3 | 18.6 |
| Relative Concentration Ratios | 1 | 2.41 | 0.75 | 1.01 | 0.37 |

A 5 liter sample of the liquid extract is collected. The pH of the liquid extract coffee source in the sample vials is measured using an ORION model 290A pH meter. The pH is observed to be 5.059. A coffee source component profile modifier (sodium hydroxide) and supplemental coffee source components for the identified relevant acids are added to the 5 liter sample. The amount and species of the coffee source component profile modifier and the supplemental coffee source components added are shown in Table 6.2.

The coffee source is heated in a MicroThermics Model 25DH UHT/HTST unit using a preheat temperature of 180° F., a flow rate of 2 liters/minute, a hold temperature of 290° F. for a hold time of 6 seconds. The liquid coffee extract is cooled to a temperature of 45° F. and packed into bottles. The resulting coffee source component profile for the relevant acids, and the relative concentration ratio ratios for those acids are shown in Table 6.3.

TABLE 6.2

|  | NaOH | malic | citric | phosphoric | formic | lactic |
|---|---|---|---|---|---|---|
| Flavor Profile Modifier | 59.7 |  |  |  |  |  |
| Supplemental Coffee Source Components, acid form |  | 14.6 | 29.2 | 13.1 | 16.3 | 6.6 |
| Supplemental Coffee Source Components - salt form |  | 39.3 | 69.1 | 39.5 |  |  |
| Total Species Contribution |  | 53.9 | 98.3 | 52.6 | 16.3 | 6.6 |

Following the addition of the coffee source component profile modifier and the supplemental coffee source components the pH of the coffee is measured to be 5.245. The bottled coffee is then placed in an 85° F. controlled temperature room that is monitored by a Partlow model MRC 5000 temperature control system for two weeks. At the conclusion of two weeks, the bottled coffee is removed, and the pH of the coffee is measured to be 4.929. The resulting coffee source component profile and the relative concentration ratios of the resulting coffee source components is determined. Their values appear in Table 6.3. The resulting coffee source component profile is compared to the target coffee source component profile and the differences are also shown in Table 6.3.

TABLE 6.3

|  | pH | malic | citric | phosphoric | formic | lactic |
|---|---|---|---|---|---|---|
| Resulting Coffee Source Component Profile | 4.929 | 103.8 | 218.4 | 89.8 | 66.6 | 25.2 |

TABLE 6.3-continued

|  | pH | malic | citric | phosphoric | formic | lactic |
|---|---|---|---|---|---|---|
| Relative Ratio of Acids (A) in Resulting Coffee Source Component Profile |  | 1 | 2.1 | 0.87 | 0.64 | 0.24 |
| Target Coffee Source Component Profile |  | 49.9 | 120.1 | 37.2 | 50.3 | 18.6 |
| Relative Ratio of Acids (A) in Target Coffee Source Component Profile |  | 1 | 2.41 | 0.75 | 1.01 | 0.37 |
| Difference of relative ratio values between an acid in the target profile and the corresponding acid in the resulting profile. |  | 0 | −0.31 | +0.12 | −0.67 | −0.13 |
| Relative concentration ratio of acid in resulting profile/ Relative concentration ratio of corresponding acid in target profile. |  | 1 | 0.87 | 1.16 | 0.63 | 0.65 |

The concentrations of the perceptible forms of the relevant acids in the resulting coffee and the target coffee are calculated using the same pH value of 5.059 (the pH value of the freshly extracted coffee source). The perceptible concentrations in the resulting coffee are found to be at least as great as the perceptible concentrations of the corresponding relevant acids in the in the target coffee (i.e., the freshly extracted coffee source).

Example 5

The liquid extract coffee source of Example 1 is utilized. The coffee source is diluted to 0.7% solids by weight using distilled water and a coffee source component profile is determined per the analytical method described herein. The coffee source component profile and relative concentration ratios are shown in Table 7.1.

TABLE 7.1

|  | malic | citric | phosphoric | formic | lactic |
|---|---|---|---|---|---|
| Coffee Source Component Profile | 49.9 | 120.1 | 37.2 | 50.3 | 18.6 |
| Relative Concentration Ratios | 1 | 2.41 | 0.75 | 1.01 | 0.37 |

A 5 liter sample of the liquid extract is collected. The pH of the liquid extract coffee source in the sample is measured using an ORION model 290A pH meter. The pH is observed to be 5.059. A coffee source component profile modifier (sodium hydroxide) and supplemental coffee source components for the identified relevant acids are added to the 5 liter sample. The amount and species of the coffee source component profile modifier and the supplemental coffee source components added are shown in Table 7.2.

The coffee source is heated in a MicroThermics Model 25DH UHT/HTST unit using a preheat temperature of 180° F., a flow rate of 2 liters/minute, a hold temperature of 290° F. for a hold time of 6 seconds. The liquid coffee extract is cooled to a temperature of 45° F. and packed into bottles. The resulting coffee source component profile for the relevant acids, and the relative concentration ratios for those acids are shown in Table 7.3.

TABLE 7.2

|  | NaOH | malic | citric | phosphoric | formic | lactic |
|---|---|---|---|---|---|---|
| Flavor Profile Modifier | 29.4 |  |  |  |  |  |
| Supplemental Coffee Source Components, acid form |  | 30.7 | 29.2 | 13.1 | 16.3 | 6.6 |
| Supplemental Coffee Source Components - salt form |  |  | 62.1 | 36.9 |  |  |
| Total Species Contribution |  | 30.7 | 91.3 | 50 | 16.3 | 6.6 |

Following the addition of the coffee source component profile modifier and the supplemental coffee source components the pH of the bottled coffee is measured to be 5.239. The bottles are then placed in an 85° F. controlled temperature room that is monitored by a Partlow model MRC 5000 temperature control system for two weeks. At the conclusion of two weeks, the bottles are removed, and the pH of the coffee is measured to be 4.935. The resulting coffee source component profile and the relative concentration ratios of the resulting coffee source components is determined. Their values appear in Table 7.3. The resulting coffee source component profile is compared to the target coffee source component profile and the differences are also shown in Table 7.3.

TABLE 7.3

|  | pH | malic | citric | phosphoric | formic | lactic |
|---|---|---|---|---|---|---|
| Resulting Coffee Source Component Profile | 4.935 | 80.6 | 211.4 | 87.2 | 66.6 | 25.2 |
| Relative Ratio of Acids (A) in Resulting Coffee Source Component Profile |  | 1 | 2.62 | 1.08 | 0.83 | 0.31 |

TABLE 7.3-continued

|  | pH | malic | citric | phosphoric | formic | lactic |
|---|---|---|---|---|---|---|
| Target Coffee Source Component Profile |  | 49.9 | 120.1 | 37.2 | 50.3 | 18.6 |
| Relative Ratio of Acids (A) in Target Coffee Source Component Profile |  | 1 | 2.41 | 0.75 | 1.01 | 0.37 |
| Difference of relative ratio values between an acid in the target profile and the corresponding acid in the resulting profile. |  | 0 | +0.21 | +0.33 | −0.18 | −0.06 |
| Relative concentration ratio of acid in resulting profile/Relative concentration ratio of corresponding acid in target profile. |  | 1 | 1.09 | 1.44 | 0.82 | 0.84 |

The concentrations of the perceptible forms of the relevant acids in the resulting coffee and the target coffee are calculated using the same pH value of 5.059 (the pH value of the freshly extracted coffee source. The perceptible concentrations in the resulting coffee are found to be at least as great as the perceptible concentrations pf the corresponding relevant acids in the in the target coffee (i.e., the freshly extracted coffee source).

Example 6

A roast and ground coffee is prepared comprising 65% by weight of a Central American Arabica, and 35% by weight of a Vietnam robusta. The blend is co-roasted to a Hunter color of 20.2 L. The roasted coffee is subsequently ground to an average particle size of 725 microns.

A coffee source comprising a liquid coffee extract is prepared from the roast and ground coffee above. The extraction column of Example 1 is filled with 5.9 kg of the prepared roast and ground coffee source. The column is flushed with nitrogen and then extracted with distilled, dearated water at the rate of 1.8 liters/minute at 180° F. The extract is cooled to 85° F. after exiting the column. The extract has a solids level of 4.2% by weight.

The coffee source comprising a liquid coffee extract is diluted to 0.7% solids by weight using distilled water and a coffee source component profile is determined per the analytical method described herein. The coffee source component profile and relative concentration ratios are shown in Table 8.1.

TABLE 8.1

|  | malic | citric | phosphoric | formic | lactic |
|---|---|---|---|---|---|
| Coffee Source Component Profile | 32.6 | 105.2 | 25.6 | 34.2 | 6.6 |
| Relative Concentration Ratios | 1 | 3.23 | 0.79 | 1.05 | 0.20 |

A 5 liter sample of the liquid extract is collected. The pH of the liquid extract coffee source in the sample is measured using an ORION model 290A pH meter. The pH is observed to be 4.96. The coffee source is heated in a MicroThermics Model 25DH UHT/HTST unit using a preheat temperature of 180° F., a flow rate of 2 liters/minute, a hold temperature of 290° F. for a hold time of 6 seconds. The liquid coffee extract is cooled to a temperature of 45° F. and packed into bottles.

The bottles are then placed in an 85° F. controlled temperature room that is monitored by a Partlow model MRC 5000 temperature control system for two weeks. A coffee source component profile modifier (sodium hydroxide) and supplemental coffee source components for the identified relevant acids are added to the bottled extract samples. The amount and species of the flavor profile modifier and the supplemental coffee source components added are shown in Table 8.2. The resulting coffee source component profile for the relevant acids, and the relative concentration ratios for those acids are shown in Table 8.3.

TABLE 8.2

|  | NaOH | malic | citric | phosphoric | formic | lactic |
|---|---|---|---|---|---|---|
| Flavor Profile Modifier | 56.7 |  |  |  |  |  |
| Supplemental Coffee Source Components, acid form |  | 39 |  |  | 40.9 | 7.9 |
| Supplemental Coffee Source Components - salt form |  |  | 125.7 | 30.5 |  |  |
| Total Species Contribution |  | 39 | 125.7 | 30.5 | 40.9 | 7.9 |

Following the addition of the coffee source component profile modifier and the supplemental coffee source components the pH of the aliquots is measured to be 4.97. The resulting coffee source component profile and the relative concentration ratios of the resulting coffee source components is determined. Their values appear in Table 8.3. The resulting coffee source component profile is compared to the target coffee source component profile and the differences are also shown in Table 8.3.

TABLE 8.3

|  | pH | malic | citric | phosphoric | formic | lactic |
|---|---|---|---|---|---|---|
| Resulting Coffee Source Component Profile | 4.97 | 71.6 | 230.9 | 56.1 | 75.1 | 14.5 |

TABLE 8.3-continued

| | pH | malic | citric | phosphoric | formic | lactic |
|---|---|---|---|---|---|---|
| Relative Ratio of Acids (A) in Resulting Coffee Source Component Profile | | 1 | 3.22 | 0.78 | 1.05 | 0.20 |
| Target Coffee Source Component Profile | | 32.6 | 105.2 | 25.6 | 34.2 | 6.6 |
| Relative Ratio of Acids (A) in Target Coffee Source Component Profile | | 1 | 3.23 | 0.79 | 1.05 | 0.20 |
| Difference of relative ratio values between an acid in the target profile and the corresponding acid in the resulting profile. | | 0 | −0.01 | −0.01 | 0 | 0 |
| Relative concentration ratio of acid in resulting profile/ Relative concentration ratio of corresponding acid in target profile. | | 1 | 1 | 0.99 | 1 | 1 |

The concentrations of the perceptible forms of the relevant acids in the resulting coffee and the target coffee are calculated using the same pH value of 4.96 (the pH value of the freshly extracted coffee source). The perceptible concentrations in the resulting coffee are found to be at least as great as the perceptible concentrations of the corresponding relevant acids in the in the target coffee (i.e., the freshly extracted coffee source).

Example 7

A roast and ground coffee is prepared comprising 65% by weight of a Central American Arabica, and 35% by weight of a Vietnam robusta. The blend is co-roasted to a Hunter color of 20.2 L. The roasted coffee is subsequently ground to an average particle size of 725 microns.

A coffee source comprising a liquid coffee extract is prepared from the roast and ground coffee above. The extraction column of Example 1 is filled with 5.9 kg of the prepared roast and ground coffee source. The column is flushed with nitrogen and then extracted with distilled, dearated water at the rate of 1.8 liters/minute at 180° F. The extract is cooled to 85° F. after exiting the column. The extract has a solids level of 4.2% by weight.

The coffee source comprising a liquid coffee extract is diluted to 0.7% solids by weight using distilled water and a coffee source component profile is determined per the analytical method described herein. The coffee source component profile and relative concentration ratios are shown in Table 9.1.

TABLE 9.1

| | malic | citric | phosphoric | formic | lactic |
|---|---|---|---|---|---|
| Coffee Source Component Profile | 32.6 | 105.2 | 25.6 | 34.2 | 6.6 |
| Relative Concentration Ratios | 1 | 3.23 | 0.79 | 1.05 | 0.20 |

A 5 liter sample of the liquid extract is collected. The pH of the liquid extract coffee source in the sample is measured using an ORION model 290A pH meter. The pH is observed to be 4.96. The coffee source is heated in a MicroThermics Model 25DH UHT/HTST unit using a preheat temperature of 180° F., a flow rate of 2 liters/minute, a hold temperature of 290° F. for a hold time of 6 seconds. The liquid coffee extract is cooled to a temperature of 45° F. and packed into bottles.

The bottles are then placed in an 85° F. controlled temperature room that is monitored by a Partlow model MRC 5000 temperature control system for two weeks. A coffee source component profile modifier (sodium hydroxide) and supplemental coffee source components for the identified relevant acids are added to the bottled extract samples. The amount and species of the coffee source component profile modifier and the supplemental coffee source components added are shown in Table 9.2. The resulting coffee source component profile for the relevant acids, and the relative concentration ratios for those acids are shown in Table 9.3.

TABLE 9.2

| | NaOH | malic | citric | phosphoric | formic | lactic |
|---|---|---|---|---|---|---|
| Flavor Profile Modifier | 101.5 | | | | | |
| Supplemental Coffee Source Components, acid form | | 21.6 | 69.7 | 17 | 22.7 | 4.4 |
| Supplemental Coffee Source Components - salt form | | | | | | |
| Total Species Contribution | | 21.6 | 69.7 | 17 | 22.7 | 4.4 |

Following the addition of the coffee source component profile modifier and the supplemental coffee source components the pH of the aliquots is measured to be 4.98. The resulting coffee source component profile and the relative concentration ratios of the resulting coffee source components is determined. Their values appear in Table 9.3. The resulting coffee source component profile is compared to the target coffee source component profile and the differences are also shown in Table 9.3.

TABLE 9.3

|  | pH | malic | citric | phosphoric | formic | lactic |
|---|---|---|---|---|---|---|
| Resulting Coffee Source Component Profile | 4.98 | 54.2 | 174.9 | 42.6 | 56.9 | 11 |
| Relative Ratio of Acids (A) in Resulting Coffee Source Component Profile |  | 1 | 3.23 | 0.79 | 1.05 | 0.20 |
| Target Coffee Source Component Profile |  | 32.6 | 105.2 | 25.6 | 34.2 | 6.6 |
| Relative Ratio of Acids (A) in Target Coffee Source Component Profile |  | 1 | 3.23 | 0.79 | 1.05 | 0.20 |
| Difference of relative ratio values between an acid in the target profile and the corresponding acid in the resulting profile. |  | 0 | 0 | 0 | 0 | 0 |
| Relative concentration ratio of acid in resulting profile/ Relative concentration ratio of corresponding acid in target profile. |  | 1 | 1 | 1 | 1 | 1 |

The concentrations of the perceptible forms of the relevant acids in the resulting coffee and the target coffee are calculated using the same pH value of 4.96 (the pH value of the freshly extracted coffee source). The perceptible concentrations in the resulting coffee are found to be at least as great as the perceptible concentrations of the corresponding relevant acids in the in the target coffee (i.e., the freshly extracted coffee source).

Having now described several embodiments of the present invention it should be clear to those skilled in the art that the forgoing is illustrative only and not limiting, having been presented only by way of exemplification. Numerous other embodiments and modifications are contemplated as falling within the scope of the present invention as defined by the appended claims thereto.

We claim:

1. A method for altering a coffee source component profile of an aged coffee source to mimic a target coffee component profile of a non-aged coffee source, wherein the aged coffee source and the non-aged coffee each comprise multiple taste contributing acids, the method comprising:
a) determining the target coffee component profile of the non-aged coffee source by measuring concentrations for two or more taste contributing acids in the non-aged coffee source;
b) determining the coffee source component profile for the aged coffee source by measuring concentrations for two or more taste contributing acids in the aged coffee source;
c) comparing the target coffee component profile to the coffee source component profile to identify a principle taste contributing acid and one or more relevant taste contributing acids, wherein the principle taste contributing acid and the one or more relevant taste contributing acids correspond to taste contributing acids in the non-aged coffee source and the aged coffee source;
d) adjusting concentration of the principle taste contributing acid in the aged coffee source to within a range of from about 50% to about 150% the concentration of the principle taste contributing acid in the non-aged coffee source; and
e) adjusting concentration of each relevant taste contributing acid in the aged coffee source to a value of $R_{CS}$, wherein $R_{CS}$ is within a range expressed as:

$$(0.5)(P_{TC}/R_{TC}) \leq (P_{CS}/R_{CS}) \leq (1.5)(P_{TC}/R_{TC})$$

wherein:
$P_{TC}$ is the concentration of the principle taste contributing acid in the non-aged coffee source;
$R_{TC}$ is the concentration of the relevant taste contributing acid in the non-aged coffee source; and
$P_{CS}$ is the concentration of the principle taste contributing acid in the aged coffee source;

to thereby alter the coffee source component profile of the aged coffee source to mimic the target coffee component profile of the non-aged coffee source.

2. The method of claim 1 wherein the aged coffee source comprises at least one taste contributing acid selected from the group consisting of acetic acid, lactic acid, malic acid, formic acid, citric acid, phosphoric acid, salts thereof and combinations thereof.

3. The method of claim 1 wherein the non-aged coffee source comprises at least one taste contributing acid selected from the group consisting of acetic acid, lactic acid, malic acid, formic acid, citric acid, phosphoric acid, salts thereof and combinations thereof.

4. The method of claim 1 wherein the concentrations of the principle taste contributing acid and the relevant taste contributing acids in the aged coffee source are adjusted by adding to the aged coffee source sufficient amounts of one or more components selected from the group consisting of a supplemental source component, a coffee source component modifier, and combinations thereof.

5. The method of claim 4 wherein the supplemental source component comprises at least two agents selected from the group consisting of acetic acid, lactic acid, malic acid, formic acid, citric acid, phosphoric acid, salts thereof and combinations thereof.

6. The method of claim 4 wherein the coffee source component modifier comprises at least one agent selected from the group consisting of sodium, magnesium, potassium, hydrogen, calcium, hydroxide and combinations thereof.

7. The method of claim 1 wherein the target coffee component profile is determined by measuring at least three taste contributing acids in the non-aged coffee source selected from the group consisting of acetic acid, lactic acid, malic acid, formic acid, citric acid, phosphoric acid, salts thereof and combinations thereof.

8. The method of claim 1 wherein the concentrations of the principle taste contributing acid and the relevant taste contributing acids in the aged coffee source are adjusted by adding to the coffee source one or more agents selected from the group consisting of acetic acid, lactic acid, malic acid, formic acid, citric acid, phosphoric acid, salts thereof and combinations thereof.

9. The method of claim 8 wherein the concentrations of the principle taste contributing acid and the relevant taste contributing acids in the aged coffee source are adjusted by adding to the coffee source at least three agents selected from the group consisting of acetic acid, lactic acid, malic acid, formic acid, citric acid, phosphoric acid, salts thereof and combinations thereof.

10. The method of claim 1 wherein the aged coffee source and the non-aged coffee source each comprise N relevant taste contributing acids, and where N is a number in the range of from about 1 to about 20.

11. The method of claim 1 wherein adjusting concentration of the principle taste contributing acid in the aged coffee source to within a range of from about 50% to about 150% the concentration of the principle taste contributing acid in the non-aged coffee source, comprises adjusting concentration of the principle taste contributing acid in the aged coffee source to within a range of from about 80% to about 120% the concentration of the principle taste contributing acid in the non-aged coffee source.

12. The method of claim 1 wherein adjusting concentration of the principle taste contributing acid in the aged coffee source to within a range of from about 50% to about 150% the concentration of the principle taste contributing acid in the non-aged coffee source, comprises adjusting concentration of the principle taste contributing acid in the aged coffee source to within a range of from about 90% to about 110% the concentration of the principle taste contributing acid in the non-aged coffee source.

13. The method of claim 1 wherein adjusting concentration of the principle taste contributing acid in the aged coffee source to within a range of from about 50% to about 150% the concentration of the principle taste contributing acid in the non-aged coffee source, comprises adjusting concentration of the principle taste contributing acid in the aged coffee source to within a range of from about 95% to about 105% the concentration of the principle taste contributing acid in the non-aged coffee source.

14. A method for mimicking a non-aged coffee flavor using an aged coffee source, wherein the aged coffee source comprises multiple taste contributing acids,
the method comprising:
a) selecting a non-aged coffee source that exhibits the desired non-aged coffee flavor, wherein the non-aged coffee source comprises multiple taste contributing acids;
b) measuring concentrations for two or more taste contributing acids in the non-aged coffee source to determine a target coffee component profile, wherein the target coffee component profile correlates to the desired non-aged coffee flavor;
c) determining pH of the non-aged coffee source, wherein the pH value of the non-aged coffee source correlates to the desired non-aged coffee flavor;
d) selecting the aged coffee source;
e) measuring concentrations for two or more taste contributing acids in the aged coffee source to determine a coffee source component profile;
f) determining pH of the aged coffee source;
g) comparing the target coffee component profile to the coffee source component profile to identify a principle taste contributing acid and one or more relevant taste contributing acids, wherein the principle taste contributing acid and the one or more relevant taste contributing acids correspond to individual taste contributing acids in the non-aged coffee source and the aged coffee source;
h) adjusting concentration of the principle taste contributing acid in the aged coffee source to within a range of from about 50% to about 150% the concentration of the principle taste contributing acid in the non-aged coffee source; and
i) adjusting concentration of each relevant taste contributing acid in the aged coffee source to a value of $R_{CS}$, wherein $R_{CS}$ is within a range expressed as:

$$(0.5)(P_{TC}/R_{TC}) \leq (P_{CS}/R_{CS}) \leq (1.5)(P_{TC}/R_{TC})$$

wherein:
$P_{TC}$ is the concentration of the principle taste contributing acid in the non-aged coffee source;
$R_{TC}$ is the concentration of the relevant taste contributing acid in the non-aged coffee source; and
$P_{CS}$ is the concentration of the principle taste contributing acid in the aged coffee source;
j) adjusting pH of the aged coffee source, after adjusting concentrations of the principle taste contributing acid and the relevant taste contributing acids in the aged coffee source, to a pH value in the range of from about 2.0 units below to about 2.0 units above the pH value of the non-aged coffee source,
to thereby mimic the desired non-aged coffee flavor.

15. A method of producing a coffee beverage composition comprising an aged coffee source having stable flavor characteristics associated with a non-aged coffee source,
the method comprising the steps of:
a) performing the method of claim 2; and optionally
b) adding one or more additional flavor sources to the coffee beverage composition, to thereby produce the coffee beverage composition having stable flavor characteristics associated with a non-aged coffee source.

16. The method of claim 15 wherein the method further comprises the step of adding in one or more components selected from the group consisting of foaming agents, mouthfeel enhancing agents, creamy components, inert fillers, carriers, sweetening agents and any combination thereof.

* * * * *

UNITED STATES PATENT AND TRADEMARK OFFICE
CERTIFICATE OF CORRECTION

| | |
|---|---|
| PATENT NO. | : 7,713,567 B2 |
| APPLICATION NO. | : 11/087757 |
| DATED | : May 11, 2010 |
| INVENTOR(S) | : Jerry Douglas Young and Douglas Craig Hardesty |

It is certified that error appears in the above-identified patent and that said Letters Patent is hereby corrected as shown below:

In Claim 1, Column 37, line 52, please delete "principle" and insert -- principal --.

In Claim 1, Column 37, line 54, please delete "principle" and insert -- principal --.

In Claim 1, Column 37, line 58, please delete "principle" and insert -- principal --.

In Claim 1, Column 37, line 62, please delete "principle" and insert -- principal --.

In Claim 1, Column 38, line 22, please delete "principle" and insert -- principal --.

In Claim 1, Column 38, line 26, please delete "principle" and insert -- principal --.

In Claim 4, Column 38, line 43, please delete "principle" and insert -- principal --.

In Claim 8, Column 38, line 65, please delete "principle" and insert -- principal --.

In Claim 9, Column 39, line 5, please delete "principle" and insert -- principal --.

In Claim 11, Column 39, line 16, please delete "principle" and insert -- principal --.

In Claim 11, Column 39, line 18, please delete "principle" and insert -- principal --.

In Claim 11, Column 39, line 20, please delete "principle" and insert -- principal --.

In Claim 11, Column 39, line 22, please delete "principle" and insert -- principal --.

In Claim 12, Column 39, line 25, please delete "principle" and insert -- principal --.

In Claim 12, Column 39, line 27, please delete "principle" and insert -- principal --.

In Claim 12, Column 39, line 29, please delete "principle" and insert -- principal --.

In Claim 12, Column 39, line 31, please delete "principle" and insert -- principal --.

Signed and Sealed this
Twenty-eighth Day of June, 2011

David J. Kappos
*Director of the United States Patent and Trademark Office*

CERTIFICATE OF CORRECTION (continued)
U.S. Pat. No. 7,713,567 B2

In Claim 13, Column 39, line 34, please delete "principle" and insert -- principal --.

In Claim 13, Column 39, line 36, please delete "principle" and insert -- principal --.

In Claim 13, Column 39, line 38, please delete "principle" and insert -- principal --.

In Claim 13, Column 39, line 40, please delete "principle" and insert -- principal --.

In Claim 14, Column 40, line 10, please delete "principle" and insert -- principal --.

In Claim 14, Column 40, line 12, please delete "principle" and insert -- principal --.

In Claim 14, Column 40, line 16, please delete "principle" and insert -- principal --.

In Claim 14, Column 40, line 19, please delete "principle" and insert -- principal --.

In Claim 14, Column 40, line 26, please delete "principle" and insert -- principal --.

In Claim 14, Column 40, line 30, please delete "principle" and insert -- principal --.

In Claim 14, Column 40, line 33, please delete "principle" and insert -- principal --.